US012007512B2

(12) United States Patent
Neumann et al.

(10) Patent No.: US 12,007,512 B2
(45) Date of Patent: Jun. 11, 2024

(54) SONAR DISPLAY FEATURES

(71) Applicant: NAVICO, INC., Tulsa, OK (US)

(72) Inventors: Karl Thomas Neumann, Marina del Rey, CA (US); Jeremiah Clark, Tulsa, OK (US)

(73) Assignee: Navico, Inc., Tulsa, OK (US)

( * ) Notice: Subject to any disclaimer, the term of this patent is extended or adjusted under 35 U.S.C. 154(b) by 107 days.

(21) Appl. No.: 17/106,272

(22) Filed: Nov. 30, 2020

(65) Prior Publication Data

US 2022/0171043 A1 Jun. 2, 2022

(51) Int. Cl.
*G01S 7/56* (2006.01)
*G01S 7/539* (2006.01)
*G01S 15/08* (2006.01)
*G01S 15/58* (2006.01)
(Continued)

(52) U.S. Cl.
CPC ............... *G01S 7/56* (2013.01); *G01S 7/539* (2013.01); *G01S 15/08* (2013.01); *G01S 15/588* (2013.01); *G01S 15/86* (2020.01); *G06F 3/14* (2013.01)

(58) Field of Classification Search
CPC . G01S 7/56; G01S 7/539; G01S 15/08; G01S 15/04; G01S 15/588; G01S 15/86; G06F 3/14
See application file for complete search history.

(56) References Cited

U.S. PATENT DOCUMENTS

| 4,445,178 A | 4/1984 | Scheer et al. |
| 4,751,787 A | 6/1988 | Jonsson |
| 4,829,493 A | 5/1989 | Bailey |

(Continued)

FOREIGN PATENT DOCUMENTS

| DE | 102004059619 | 6/2006 |
| EP | 1 561 377 | 8/2005 |

(Continued)

OTHER PUBLICATIONS

M. Valdenegro-Toro, "Object recognition in forward-looking sonar images with Convolutional Neural Networks," OCEANS 2016 MTS/IEEE Monterey, 2016, pp. 1-6. (Year: 2016).*

(Continued)

*Primary Examiner* — Isam A Alsomiri
*Assistant Examiner* — Joseph C Fritchman
(74) *Attorney, Agent, or Firm* — Nelson Mullins Riley & Scarborough LLP

(57) ABSTRACT

A system for analysis of sonar data is provided comprising sonar transducer assembl(ies), processor(s), and a memory. The memory includes computer program code that is configured to, when executed, cause processor(s) to receive sonar data, where an object is represented within sonar data, and additional data from a data source other than the sonar transducer assembl(ies). The processor(s) further determine object characteristic(s) of the object using sonar data and additional data, and determine an estimated object-type for the object represented within sonar data using the object characteristic(s). The processor(s) further generate a sonar image based on sonar data, cause display of the sonar image, and cause provision of an indication of the estimated object-type so that the indication of the estimated object-type is correlated to the object representation in the sonar image.

16 Claims, 26 Drawing Sheets

(51) Int. Cl.
    *G01S 15/86*   (2020.01)
    *G06F 3/14*    (2006.01)

(56)            References Cited

U.S. PATENT DOCUMENTS

| | | | |
|---|---|---|---|
| 4,879,697 | A | 11/1989 | Lowrance et al. |
| 5,025,423 | A | 6/1991 | Earp |
| 5,191,341 | A | 3/1993 | Gouard et al. |
| 5,228,228 | A | 7/1993 | Meissner |
| 5,321,391 | A | 6/1994 | Fox |
| 5,446,775 | A | 8/1995 | Wright et al. |
| 5,537,380 | A | 7/1996 | Sprankle, Jr. et al. |
| 5,546,695 | A | 8/1996 | Langer |
| 6,045,076 | A | 4/2000 | Daniels |
| 6,125,571 | A | 10/2000 | Sigwald |
| 6,222,449 | B1 | 4/2001 | Twining |
| 6,225,984 | B1 | 5/2001 | Crawford |
| 6,252,544 | B1 | 6/2001 | Hoffberg |
| 6,263,147 | B1 | 7/2001 | Tognazzini |
| 6,321,158 | B1 | 11/2001 | DeLorme et al. |
| 6,411,283 | B1 | 6/2002 | Murphy |
| 6,418,080 | B2 | 7/2002 | Inouchi |
| 6,421,299 | B1 | 7/2002 | Betts et al. |
| 6,459,372 | B1 | 10/2002 | Branham et al. |
| 6,567,792 | B1 | 5/2003 | Arnold |
| 6,584,722 | B1 | 7/2003 | Walls et al. |
| 6,587,740 | B2 | 7/2003 | Byrne et al. |
| 6,751,626 | B2 | 6/2004 | Brown et al. |
| 6,761,692 | B2 | 7/2004 | Angelsen et al. |
| 6,798,378 | B1 | 9/2004 | Walters |
| 6,816,782 | B1 | 11/2004 | Walters et al. |
| 7,002,579 | B2 | 2/2006 | Olson |
| 7,200,488 | B2 | 4/2007 | Taboada |
| 7,236,426 | B2 | 6/2007 | Turner et al. |
| 7,243,457 | B1 | 7/2007 | Smith et al. |
| 7,248,159 | B2 | 7/2007 | Smith |
| 7,254,483 | B2 | 8/2007 | Squires et al. |
| 7,319,992 | B2 | 1/2008 | Gaos |
| 7,321,824 | B1 | 1/2008 | Nesbitt |
| 7,430,461 | B1 | 9/2008 | Michaels |
| 7,652,952 | B2 | 1/2010 | Betts et al. |
| 7,669,360 | B2 | 3/2010 | Davidson |
| 7,710,825 | B2 | 5/2010 | Betts et al. |
| 7,722,218 | B2 | 5/2010 | Leung |
| 7,729,203 | B2 | 6/2010 | Betts et al. |
| 7,755,974 | B2 | 7/2010 | Betts et al. |
| 7,812,667 | B2 | 10/2010 | Fagg |
| 7,870,496 | B1 | 1/2011 | Sherwani |
| 7,877,502 | B2 | 1/2011 | Rensin et al. |
| 7,890,867 | B1 | 2/2011 | Margulis |
| 8,019,532 | B2 | 9/2011 | Sheha et al. |
| 8,040,758 | B1 | 10/2011 | Dickinson |
| 8,063,540 | B2 | 11/2011 | Angelsen et al. |
| 8,082,100 | B2 | 12/2011 | Grace et al. |
| 8,364,806 | B2 | 1/2013 | Short et al. |
| 8,447,332 | B2 | 5/2013 | Weinreich et al. |
| 8,452,797 | B1 | 5/2013 | Paleja et al. |
| 8,468,164 | B1 | 6/2013 | Paleja et al. |
| 8,510,028 | B2 | 8/2013 | Grace et al. |
| 8,512,238 | B2 | 8/2013 | Nissilä et al. |
| 8,515,660 | B2 | 8/2013 | Grace et al. |
| 8,515,661 | B2 | 8/2013 | Grace et al. |
| 8,527,192 | B2 | 9/2013 | Grace et al. |
| 8,543,324 | B2 | 9/2013 | Grace et al. |
| 8,721,453 | B2 | 5/2014 | Rosing |
| 8,775,669 | B2 | 7/2014 | Hutchinson |
| 8,831,868 | B2 | 9/2014 | Grace et al. |
| 8,838,536 | B2 | 9/2014 | Bhanote |
| 9,104,697 | B2 | 8/2015 | Lauenstein et al. |
| 9,162,743 | B1 | 10/2015 | Grace et al. |
| 9,200,882 | B2 | 12/2015 | Lauenstein et al. |
| 9,213,722 | B2 | 12/2015 | Lauenstein et al. |
| 9,266,589 | B2 | 2/2016 | Grace et al. |
| 9,361,314 | B2 | 6/2016 | Lauenstein et al. |
| 9,367,565 | B2 | 6/2016 | Lauenstein et al. |
| 9,430,497 | B2 | 8/2016 | Lauenstein et al. |
| 9,439,411 | B2 | 9/2016 | Bailey |
| 9,507,562 | B2 | 11/2016 | Bailey |
| 9,572,335 | B2 | 2/2017 | Bailey |
| 9,615,562 | B2 | 4/2017 | Bailey |
| 9,992,987 | B2 | 6/2018 | Bailey |
| 10,251,382 | B2 | 4/2019 | Bailey |
| 10,832,418 | B1 * | 11/2020 | Karasev ............... G06V 10/42 |
| 2001/0054961 | A1 | 12/2001 | Twining |
| 2002/0035574 | A1 | 3/2002 | Dumas |
| 2002/0093541 | A1 | 7/2002 | Schileru-Key |
| 2002/0099457 | A1 | 7/2002 | Fredlund et al. |
| 2002/0116421 | A1 | 8/2002 | Fox et al. |
| 2003/0046689 | A1 | 3/2003 | Gaos |
| 2003/0056419 | A1 | 3/2003 | Squires et al. |
| 2003/0089020 | A1 | 5/2003 | Dirito |
| 2003/0147981 | A1 | 8/2003 | Gillam |
| 2004/0124297 | A1 | 7/2004 | Steer |
| 2004/0162830 | A1 | 8/2004 | Shirwadkar et al. |
| 2004/0193364 | A1 | 9/2004 | Chojnacki |
| 2004/0198554 | A1 | 10/2004 | Orr et al. |
| 2004/0249860 | A1 | 12/2004 | Stechschulte et al. |
| 2005/0011105 | A1 | 1/2005 | Cameron et al. |
| 2005/0037872 | A1 | 2/2005 | Fredlund et al. |
| 2005/0102101 | A1 | 5/2005 | Beesley et al. |
| 2006/0013066 | A1 | 1/2006 | Nishimori et al. |
| 2006/0048434 | A1 | 3/2006 | Congel |
| 2006/0053028 | A1 | 3/2006 | Congel |
| 2006/0119585 | A1 | 6/2006 | Skinner |
| 2006/0224940 | A1 | 10/2006 | Lee |
| 2006/0265931 | A1 | 11/2006 | McFadden et al. |
| 2007/0011334 | A1 | 1/2007 | Higgins et al. |
| 2007/0045010 | A1 | 3/2007 | Kasperek |
| 2007/0058489 | A1 | 3/2007 | Bratcher |
| 2007/0220798 | A1 | 9/2007 | Davidson |
| 2008/0032666 | A1 | 2/2008 | Hughes |
| 2008/0126935 | A1 | 5/2008 | Blomgren |
| 2008/0165022 | A1 | 7/2008 | Herz et al. |
| 2008/0195313 | A1 | 8/2008 | Coleman |
| 2008/0204424 | A1 | 8/2008 | Jin et al. |
| 2008/0246627 | A1 | 10/2008 | Guazzelli |
| 2009/0064055 | A1 | 3/2009 | Chaudhri et al. |
| 2009/0099871 | A1 | 4/2009 | Gadodia |
| 2009/0105952 | A1 | 4/2009 | Grace et al. |
| 2009/0126254 | A1 | 5/2009 | Yamazaki et al. |
| 2009/0179789 | A1 | 7/2009 | Haughay, Jr. et al. |
| 2009/0231190 | A1 | 9/2009 | Grumbles |
| 2009/0240354 | A1 | 9/2009 | Davidson |
| 2009/0241636 | A1 | 10/2009 | Obori |
| 2009/0249247 | A1 | 10/2009 | Tseng et al. |
| 2009/0258710 | A1 | 10/2009 | Quatrochi |
| 2009/0271054 | A1 | 10/2009 | Dokken |
| 2009/0287409 | A1 | 11/2009 | Summers |
| 2009/0293336 | A1 | 12/2009 | Lankinen |
| 2009/0295626 | A1 | 12/2009 | Su |
| 2010/0049468 | A1 | 2/2010 | Papadourakis |
| 2010/0080082 | A1 | 4/2010 | Betts et al. |
| 2010/0121716 | A1 | 5/2010 | Golan |
| 2010/0145601 | A1 | 6/2010 | Kurtti et al. |
| 2010/0198650 | A1 | 8/2010 | Shaw |
| 2010/0199225 | A1 | 8/2010 | Coleman et al. |
| 2010/0226203 | A1 | 9/2010 | Buttle et al. |
| 2010/0250122 | A1 | 9/2010 | Kubota et al. |
| 2010/0295781 | A1 | 11/2010 | Alameh et al. |
| 2010/0319235 | A1 | 12/2010 | Panaro |
| 2011/0007035 | A1 | 1/2011 | Shai |
| 2011/0013484 | A1 | 1/2011 | Coleman et al. |
| 2011/0013485 | A1 | 1/2011 | Maguire |
| 2011/0019887 | A1 | 1/2011 | Roehrig et al. |
| 2011/0025720 | A1 | 2/2011 | Jo et al. |
| 2011/0067290 | A1 | 3/2011 | Miskatovic |
| 2011/0082644 | A1 | 4/2011 | Imasaka et al. |
| 2011/0154183 | A1 | 6/2011 | Burns et al. |
| 2011/0208479 | A1 | 8/2011 | Chaves |
| 2011/0213515 | A1 | 9/2011 | Haymart et al. |
| 2011/0214500 | A1 | 9/2011 | Cabrera et al. |
| 2011/0257819 | A1 | 10/2011 | Chen et al. |
| 2011/0279673 | A1 * | 11/2011 | Teich ............... H04N 7/18 348/148 |

(56) References Cited

U.S. PATENT DOCUMENTS

| | | |
|---|---|---|
| 2012/0001773 A1 | 1/2012 | Lyons et al. |
| 2012/0010478 A1 | 1/2012 | Kinnunen et al. |
| 2012/0011437 A1 | 1/2012 | James et al. |
| 2012/0014220 A1 | 1/2012 | DePasqua |
| 2012/0047790 A1 | 3/2012 | Hess et al. |
| 2012/0069712 A1 | 3/2012 | Potanin et al. |
| 2012/0095978 A1 | 4/2012 | Levin et al. |
| 2012/0106300 A1 | 5/2012 | Maguire |
| 2012/0144384 A1 | 6/2012 | Baek |
| 2012/0144723 A1 | 6/2012 | Davidson |
| 2012/0185801 A1 | 7/2012 | Madonna et al. |
| 2012/0253485 A1 | 10/2012 | Weast et al. |
| 2012/0293323 A1 | 11/2012 | Kaib et al. |
| 2012/0316456 A1 | 12/2012 | Rahman et al. |
| 2012/0316458 A1 | 12/2012 | Rahman et al. |
| 2012/0317167 A1 | 12/2012 | Rahman et al. |
| 2013/0007665 A1 | 1/2013 | Chaudhri et al. |
| 2013/0040714 A1 | 2/2013 | Rosing |
| 2013/0074051 A1 | 3/2013 | Freeman |
| 2013/0096575 A1 | 4/2013 | Olson |
| 2013/0107031 A1 | 5/2013 | Atkinson |
| 2013/0109997 A1 | 5/2013 | Linke et al. |
| 2013/0271301 A1 | 10/2013 | Kabel et al. |
| 2013/0281087 A1 | 10/2013 | Ruhanen et al. |
| 2013/0307720 A1 | 11/2013 | Lilburn |
| 2013/0343151 A1 | 12/2013 | Shiraki et al. |
| 2014/0012587 A1 | 1/2014 | Park |
| 2014/0032468 A1 | 1/2014 | Anandaraj |
| 2014/0071059 A1 | 3/2014 | Girault |
| 2014/0111368 A1 | 4/2014 | Lee et al. |
| 2014/0135592 A1 | 5/2014 | Ohnemus et al. |
| 2014/0135631 A1 | 5/2014 | Brumback et al. |
| 2014/0164375 A1 | 6/2014 | Persson et al. |
| 2014/0180566 A1 | 6/2014 | Malhotra |
| 2014/0195297 A1 | 7/2014 | Abuelsaad et al. |
| 2014/0221854 A1 | 8/2014 | Wai |
| 2014/0358483 A1 | 12/2014 | da Rosa |
| 2015/0019135 A1 | 1/2015 | Kacyvenski |
| 2015/0051786 A1 | 2/2015 | Wang |
| 2015/0054655 A1 | 2/2015 | Bailey |
| 2015/0054732 A1 | 2/2015 | Bailey |
| 2015/0054828 A1 | 2/2015 | Bailey |
| 2015/0054829 A1 | 2/2015 | Bailey |
| 2015/0055827 A1 | 2/2015 | Bailey |
| 2015/0055930 A1 | 2/2015 | Bailey |
| 2015/0057929 A1 | 2/2015 | Bailey |
| 2015/0057965 A1 | 2/2015 | Gaynor |
| 2015/0057968 A1 | 2/2015 | Bailey |
| 2015/0058020 A1 | 2/2015 | Bailey |
| 2015/0058237 A1 | 2/2015 | Bailey |
| 2015/0058323 A1 | 2/2015 | Bailey |
| 2015/0078122 A1 | 3/2015 | Langford-Wood |
| 2015/0205865 A1 | 7/2015 | Wang et al. |
| 2015/0245777 A1 | 9/2015 | Della Torre et al. |
| 2015/0310524 A1 | 10/2015 | Gospodarek et al. |
| 2015/0313199 A1 | 11/2015 | Castaneda et al. |
| 2015/0342481 A1 | 12/2015 | Lie et al. |
| 2015/0346729 A1 | 12/2015 | Grace et al. |
| 2016/0011310 A1* | 1/2016 | Horner .................... G06T 7/143 345/419 |
| 2016/0095393 A1 | 4/2016 | Lin |
| 2016/0098865 A1 | 4/2016 | Grace et al. |
| 2016/0098866 A1 | 4/2016 | Grace et al. |
| 2016/0098867 A1 | 4/2016 | Grace et al. |
| 2016/0101841 A1 | 4/2016 | Grace et al. |
| 2016/0125348 A1 | 5/2016 | Dyer et al. |
| 2016/0146936 A1 | 5/2016 | Konig |
| 2016/0306040 A1* | 10/2016 | Hunt ....................... G01S 15/96 |
| 2017/0371039 A1* | 12/2017 | Clark ...................... G01S 7/539 |
| 2018/0059230 A1 | 3/2018 | Synder |
| 2018/0164434 A1* | 6/2018 | Stokes .................. G01S 7/6263 |
| 2019/0120959 A1 | 4/2019 | Laster |
| 2019/0353744 A1* | 11/2019 | Laster ................. G01S 15/8902 |
| 2020/0064471 A1* | 2/2020 | Gatland ............... H04N 13/388 |
| 2020/0379104 A1* | 12/2020 | Zimmerman ....... G01S 7/52003 |
| 2022/0301302 A1* | 9/2022 | Murphy ............... G05D 1/0044 |

FOREIGN PATENT DOCUMENTS

| | | |
|---|---|---|
| EP | 2 613 223 | 7/2013 |
| GB | 2244195 A | 11/1991 |
| GB | 2426680 A | 12/2006 |
| GB | 2465162 | 5/2010 |
| GB | 2470904 | 12/2010 |
| JP | 2004 207812 A | 7/2004 |
| JP | 2006-158239 | 6/2006 |
| JP | 2010 193284 A | 9/2010 |
| JP | 2011 139647 A | 7/2011 |
| WO | WO 1998/002037 A1 | 1/1998 |
| WO | WO 2004/088572 | 10/2004 |
| WO | WO 2010/056392 | 5/2010 |
| WO | WO 2012/059734 A1 | 5/2012 |
| WO | WO 2012/170163 | 12/2012 |
| WO | WO 2014/088508 A1 | 6/2014 |
| ZA | 2003-08 052 A | 7/2004 |

OTHER PUBLICATIONS

"AngelList;" FishBrain; retrieved Aug. 24, 2016 from https://angel.co/fishbrain.

"FishHunter—Portable Fish Finder—Fishing App;" Fish Hunter; retrieved Aug. 31, 2016 from http://www.fishhunter.com/home.

"Introducing the New GoFree Hooked Fishing App;" GoFree; retrieved Aug. 31, 2016 from https://gofreemarine.com/apps/.

"Love Fishing More;" Fishbrain; retrieved Aug. 24, 2016 from http://www.fishbrain.com/.

"My Stringer;" Red Pine Media; retrieved Aug. 31, 2016 from https://itunes.apple.com/us/app/my-stringer/id536810604?mt=8.

"StockCharts.com;" retrieved Aug. 24, 2016 from http://www.stockcharts.com/.

Understanding Freshwater Fish Behavior to Become a Better Fly Fisher; *FFi Learning Center*; retrieved Aug. 28, 2020 from https://flyfishersinternational.org/Portals/0/LearningCenter/Presentations/FlyFishingSkills/FFI.

Allen, et al.; "Upper Extremity Kinematic Trends of Fly-Casting; Establishing the Effects of Line Length;" Sports Biomechanics; vol. 7, No. 1; Jan. 1, 2008; pp. 38-53.

Cristando et al.; "Nikeplus Ecosystem Strategy" retrieved Sep. 1, 2017 from <http://studylib.net/doc/8718940/nikeplus-ecosystem-strategy> 12 pages.

Davidson; "Jaybird Reign REVIEW—Lightweight, simple, lacking" Feb. 28, 2016, Technobuffalo, retrieved Sep. 1, 2017 from <https://www.technobuffalo.com/reviews/jaybird-reign-review/> 14 pages.

Dec. 12, 2014 Search Report and Written Opinion issued in International Patent Application No. PCT/IB2014/063976.

Dec. 19, 2014 Search Report and Written Opinion issued in International Patent Application No. PCT/IB2014/063978.

Dec. 2, 2014 Search Report and Written Opinion issued in International Patent Application No. PCT/IB2014/063974.

Dec. 22, 2014 Search Report and Written Opinion issued in International Patent Application No. PCT/IB2014/063982.

Dec. 3, 2014 Search Report and Written Opinion issued in International Patent Application No. PCT/IB2014/063975.

Feb. 10, 2015 Search Report and Written Opinion issued in International Patent Application No. PCT/IB2014/063981.

Feb. 18, 2014 Search Report and Written Opinion issued in International Patent Application No. PCT/IB2013/060285.

Feb. 7, 2017 Office Action Issued in Canadian Patent Application 2,921,317.

Foote; "Conserving a Behavior: A Unique Fish Behavior Observed for the First—and last—time ?;" *BMC Series Blog*; Mar. 16, 2017; retrieved Aug. 28, 2020 from https://blogs.biomedcentral.com/bmcseriesblog/2017/03/16/conserving-behavior-unique-fish-.

Jan. 5, 2015 Search Report and Written Opinion issued in International Patent Application No. PCT/IB2014/063980.

(56) References Cited

OTHER PUBLICATIONS

Jan. 7, 2015 Search Report and Written Opinion issued in International Patent Application No. PCT/IB2014/063979.
Maker; First look at new Mio Link ANT +/Bluetooth Smart optical heart rate wrist band; http://www.dcrainmaker.com/2014/01/mio-link-first-look.html; Jan. 6, 2014 (accessed Mar. 3, 2014).
Mar. 5, 2015 Search Report and Written Opinion issued in International Patent Application No. PCT/IB2014/063983.
McElderry; "At-Sea Observing Using Video-Based Electronic Monitoring;" Archipelago Marine Research Ltd.; Prepared for: Electronic Monitoring Workshop Jul. 29-30, 2008.
Nov. 28, 2014 Search Report and Written Opinion issued in International Patent Application No. PCT/IB2014/063973.
Nov. 28, 2014 Search Report and Written Opinion issued in International Patent Application No. PCT/IB2014/063977.
Oct. 11, 2013 Search Report and Written Opinion issued in International Patent Application No. PCT/US2013/047926.
Oct. 17, 2013 Search Report and Written Opinion issued in International Patent Application No. PCT/US2013/048129.
Oct. 21, 2013 Search Report and Written Opinion issued in International Patent Application No. PCT/US2013/047869.
Oct. 21, 2013 Search Report and Written Opinion issued in International Patent Application No. PCT/US2013/048177.
Sas, "SAS BI Dashboard 4.31 User's Guide", Second Edition, by SAS Electronic book, Aug. 1, 2012, downloaded at http://support.sas.com/documentation/cdl/en/bidbrdug/65580/PDF/default/bidrdrug.pdf.
Sep. 27, 2013 Search Report and Written Opinion issued in International Patent Application No. PCT/US2013/047645.

* cited by examiner

SONAR DISPLAY FEATURES

FIELD OF THE INVENTION

Embodiments of the present invention relate generally to the analysis and presentation of sonar data, and more particularly, to providing sonar data to a user in a manner that is readily understandable.

BACKGROUND OF THE INVENTION

One or more sonar transducers may be used in conjunction with watercraft, and data created by these sonar transducers may be presented on a display within the watercraft. The presentation of the sonar data within a display, however, is often limited in several respects and/or difficult to interpret. Where the display presents sonar data with representations of multiple objects, it may be difficult to distinguish between the objects and to identify what kind of object is represented within the sonar data. Further, the interpretation of sonar data often requires a significant amount of knowledge and experience, so novice users may particularly have difficulty in interpreting sonar data presented on displays.

BRIEF SUMMARY OF THE INVENTION

The system may beneficially use artificial intelligence to assist in interpreting and presenting sonar data. The sonar data may include representations of various objects, and these objects have various characteristics such as the type of object, speed, direction, position, depth, etc. One or more processors may refine a model for determining the object characteristics using known historical comparisons between the sonar data and additional data. The system may revise an initial hypothesized model, or the system may develop a new model based on provided data. The system may evaluate data and manipulate the weight to be provided for each type of input data to improve the accuracy of the model. Once the model is sufficiently refined, the model may be employed to determine estimated object-types for objects within the sonar data. The model may use sonar data from sonar returns received at one or more sonar transducers and additional data from other sources such as a radar, a sensor associated with a motor, additional sonar transducers, map data saved in memory, etc. Various object characteristics such as a shape of an object, a depth of the object, an environment of the object, a velocity of the object, a temperature of water, an intensity of the sonar data or an intensity of the additional data, a behavior of the object, a geographical area, a time of day, or a time of year may be determined. These object characteristics may then be used to determine an estimated object-type for an object represented in sonar data using artificial intelligence techniques or other techniques. Accordingly, all users (novices to experts) may benefit from the experience of the models. Importantly, this may equip a user with easy to understand and easy to reference knowledge of the sonar returns, giving even a novice user the benefits that normally require extensive experience.

Example systems may beneficially determine expected object characteristics and/or an estimated object-type by accounting for several different types of data. In some systems, even after a model is deployed, the system may beneficially improve the developed model by analyzing further data points. Embodiments described herein also allow for the use of artificial intelligence to verify the accuracy of sonar data. For example, sonar data can be compared to additional data such as geographical data stored within the system's memory, and the system may present warnings about potential inaccuracy within the sonar. Artificial intelligence may also recognize patterns within the data and detect when the patterns are incorrect or when a data point deviates significantly from the recognized pattern, and this may be beneficial to identify issues with the sonar device and/or other marine devices. By being able to verify the accuracy of sonar data, the system may also allow for greater accuracy in the detection of an object-type and other object characteristics, and this improved accuracy may improve the decision-making by a user.

Artificial intelligence may also be used to make warnings about objects recognized in sonar data. A predicted path of the watercraft may be known, and artificial intelligence may be used to recognize when certain objects may present a hazard to the watercraft or users on the watercraft. Further, models may be developed through the use of artificial intelligence to determine a recommended path for a watercraft where objects are likely to fall within the current path of a watercraft. This may advantageously assist in avoiding any dangerous contact with other objects.

In some embodiments, an algorithmic approach may be utilized to determine object characteristics, an estimated object-type, predicted paths, and other information, such as with or without the use of artificial intelligence.

In some embodiments, improved displays are provided that provide the information to users in a readily understandable format. By improving the display, the user may quickly review the display and make well-informed decisions. The improved display features are particularly helpful for inexperienced users. The system may emphasize the representations of objects within the display so that the user may quickly identify objects of importance or objects that may meet some defined criteria. Further, the system may present the representations of objects in the display in different colors based on the type of object; for example, animals (e.g., fish) may be illustrated in one color while land masses and/or structures may be illustrated in another color. These improved display features may be provided in conjunction with artificial intelligence techniques and/or algorithmic approaches so that object characteristics and/or estimated object-types may be determined and presented in a clear manner.

In an example embodiment, a system for analysis of sonar data is provided. The system comprises one or more sonar transducer assemblies configured to provide sonar data, and one or more processors. The system also comprises a memory including computer program code configured to, when executed, cause the one or more processors to perform certain operations. The operations include receiving the sonar data, wherein an object is represented within the sonar data. The operations also include receiving additional data from a data source other than the one or more sonar transducer assemblies. The operations further include determining one or more object characteristics of the object using the sonar data and the additional data. The one or more object characteristics comprises at least one of a shape of the object, a depth of the object, an environment of the object, a velocity of the object, a temperature of the water, an intensity of the sonar data, an intensity of the additional data, a behavior of the object, a geographical area, a time of day, or a time of year. The operations also include determining an estimated object-type for the object that is represented within the sonar data using the one or more object characteristics, generating a sonar image based on the sonar data, and causing display of the sonar image. The sonar image includes a representation of the object. The operations further include causing an indication of the estimated object-type for the object to be provided to a user, wherein the indication of the estimated object-type is correlated to the representation of the object in the sonar image.

In some embodiments, the one or more processors are configured to utilize a model to determine the estimated object-type for the object. The model is formed based on historical comparisons of a historical object-type with historical sonar data and historical additional data. In some of these embodiments, the model is developed through machine learning utilizing artificial intelligence based on the historical comparisons of the historical object-type with historical sonar data and historical additional data.

In some embodiments, the additional data is provided from at least one of a camera, a radar, a thermometer, a clock, a pressure sensor, a direction sensor, or a position sensor.

In some embodiments, the one or more sonar transducer assemblies comprises at least one of a linear downscan sonar transducer, a conical downscan sonar transducer, a sonar transducer array, or a sidescan sonar transducer.

In some embodiments, the memory including computer program code is configured to, when executed, cause the one or more processors to present information on the display about the estimated object-type to the user. This information comprises one or more estimated object-types and at least one of a probability that the object has an estimated object-type, the determined one or more object characteristics, hazards presented by the object, or a direction of the object.

In some embodiments, the memory including computer program code is configured to, when executed, cause the one or more processors to determine the estimated object-type by determining an estimated animal-type using the determined one or more object characteristics. In some of these embodiments, the memory including computer program code is configured to, when executed, cause the one or more processors to cause display of information about the estimated animal-type to the user. This information comprises one or more estimated animal-types and at least one of a probability that the object has an estimated animal-type, the determined one or more object characteristics, hazards presented by the animal, the direction of the animal, a predicted number of similar estimated animal-types nearby, bait information about specific types of bait that the estimated animal-type is attracted to, or unique behaviors of the estimated animal-type. In some of the embodiments, the memory including computer program code is configured to, when executed, cause the one or more processors to determine the estimated animal-type by determining an estimated fish-type using the determined one or more object characteristics.

In some embodiments, the additional data comprises at least one of humidity data, temperature data, pressure data, precipitation data, water current data, weather data, radar data, GPS data, compass data, heading sensor data, position data for a watercraft, directional data for a watercraft, directional data from a motor or a rudder of a watercraft, image data from a camera, data regarding the date or time, navigational data, or geographical data.

In some embodiments, the memory including computer program code is further configured to, when executed, cause the one or more processors to cause presentation of the indication of the estimated object-type for the object in a first window along with the sonar data and such that the indication of the estimated object-type is presented proximate to the representation of the object.

In some embodiments, the display comprises at least a first area. Additionally, the memory including computer program code is further configured to, when executed, cause presentation of the sonar data in a first window within the first area and presentation of the indication of the estimated object-type in a second window within the first area.

In some embodiments, the display comprises at least a first area and a second area. Additionally, the memory including computer program code is further configured to, when executed, cause presentation of the sonar data in the first area and presentation of the indication of the estimated object-type in the second area. The first area is separate from the second area in these embodiments.

In some embodiments, the one or more object characteristics comprises at least two object characteristics. Additionally, the computer program code is configured to, when executed, cause the processor to perform certain operations. These operations include causing presentation of the indication of a first characteristic for the estimated object-type on the display; receiving an indicator that the user has selected the representation of the object within the display; and causing, in response to receiving the indicator, the presentation of an indication of a second characteristic for the estimated object-type on the display.

In some embodiments, the processor is configured to utilize a model developed through artificial intelligence. This model is formed based on historical comparisons of additional data and the sonar data. The processor is configured to input the sonar data and the additional data into the model to determine the one or more object characteristics.

In another example embodiment, a marine electronic device for analysis of sonar data is provided. The marine electronic device comprises one or more processors and a memory including computer program code configured to, when executed, cause the one or more processors to perform certain tasks. These tasks include receiving sonar data with an object being represented within the sonar data and also receiving additional data from a data source other than a sonar transducer assembly. The tasks also include determining one or more object characteristics of the object using the sonar data and the additional data. The one or more object characteristics comprises at least one of a shape of the object, a depth of the object, an environment of the object, a velocity of the object, a temperature of the water, an intensity of the sonar data, an intensity of the additional data, behavior of the object, a geographical area, a time of day, or a time of year. Additionally, the tasks include determining an estimated object-type for the object that is represented within the sonar data using the one or more object characteristics; generating a sonar image based on the sonar data with the sonar image including a representation of the object; causing display of the sonar image; and causing an indication of the estimated object-type for the object to be provided to a user. The indication of the estimated object-type is correlated to the representation of the object in the sonar image.

In some embodiments, the one or more processors are configured to utilize a model to determine the estimated object-type for the object. The model is formed based on historical comparisons of a historical object-type with historical sonar data and historical additional data. Additionally, the model is developed through machine learning utilizing artificial intelligence.

In some embodiments, the memory including computer program code is configured to, when executed, cause the one or more processors to present information on the display about the estimated object-type to the user. The information comprises one or more estimated object-types. The information also comprises at least one of a probability that the object has an estimated object-type, the determined one or more object characteristics, hazards presented by the object, or a direction of the object.

In yet another example embodiment, a method for the analysis of sonar data is provided. The method comprises receiving sonar data from one or more sonar transducer assemblies with an object being represented within the sonar data; receiving additional data from a data source other than the one or more sonar transducer assemblies; and determining one or more object characteristics of the object using the sonar data and the additional data. The one or more object characteristics comprises at least one of a shape of the object, a depth of the object, an environment of the object, a velocity of the object, a temperature of the water, an intensity of the sonar data, an intensity of the additional data, behavior of the object, a geographical area, a time of day, or a time of year. The method further comprises determining an estimated object-type for the object that is represented within the sonar data using the one or more object characteristics; generating a sonar image based on the sonar data with the sonar image including a representation of the object; causing display of the sonar image; and causing an indication of the estimated object-type for the object to be provided to a user. The indication of the estimated object-type is correlated to the representation of the object in the sonar image.

In some embodiments of the method, determining the estimated object-type comprises utilizing a model that is formed based on historical comparisons of a historical object-type with historical sonar data and historical additional data. This model may be developed through machine learning utilizing artificial intelligence.

BRIEF DESCRIPTION OF THE DRAWINGS

Figure 1:
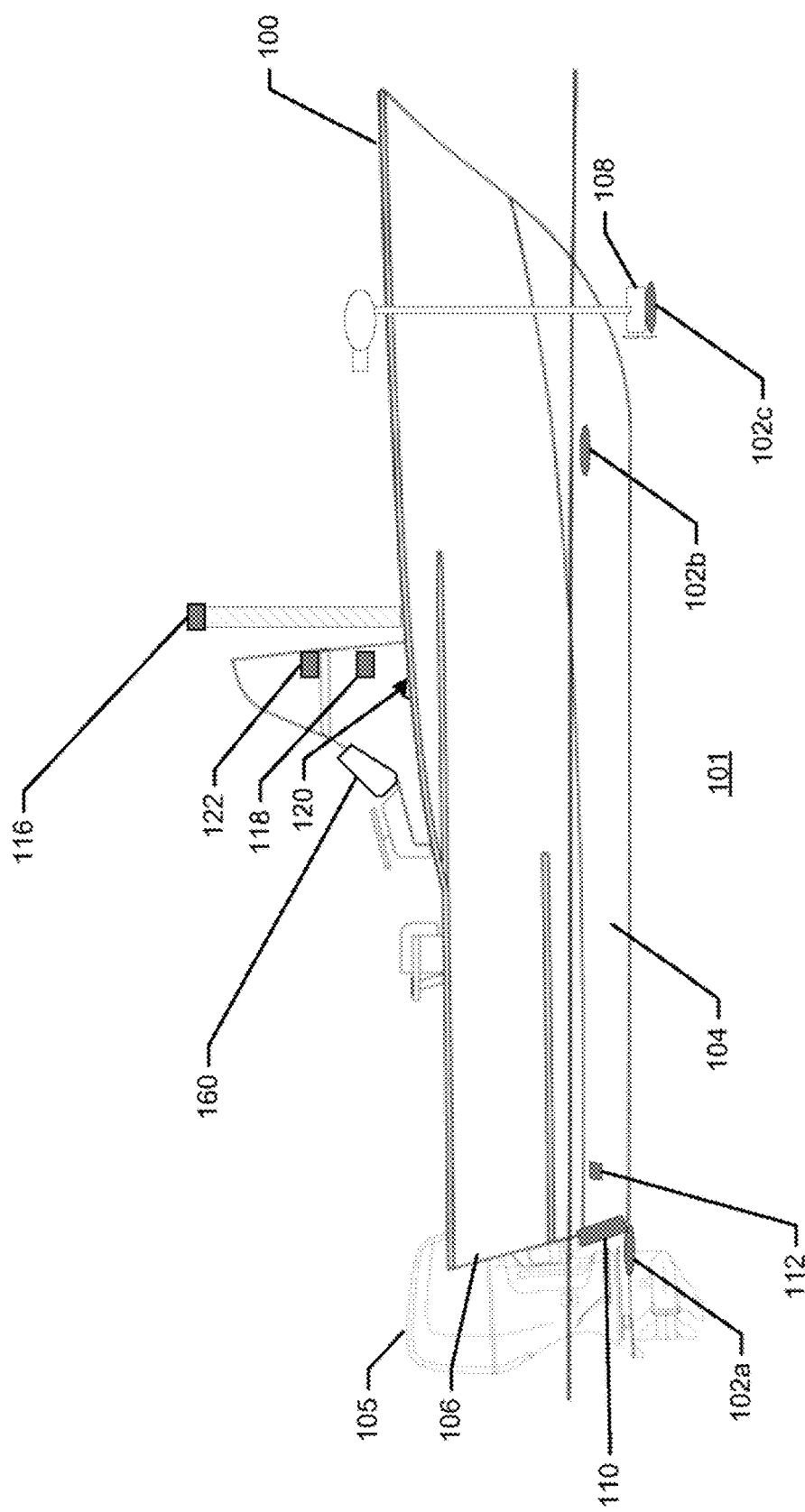
Figure 2:
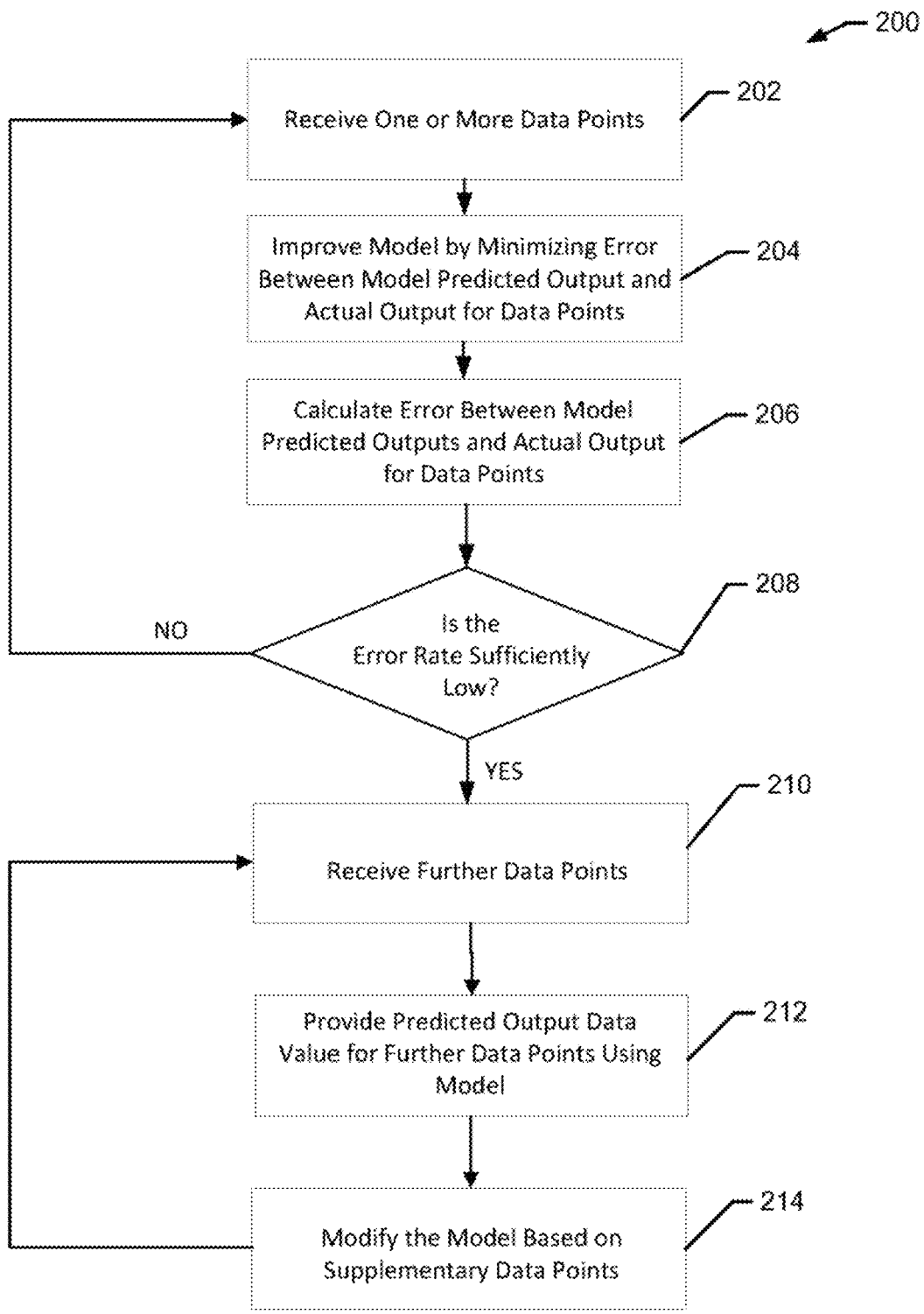
Figure 4:
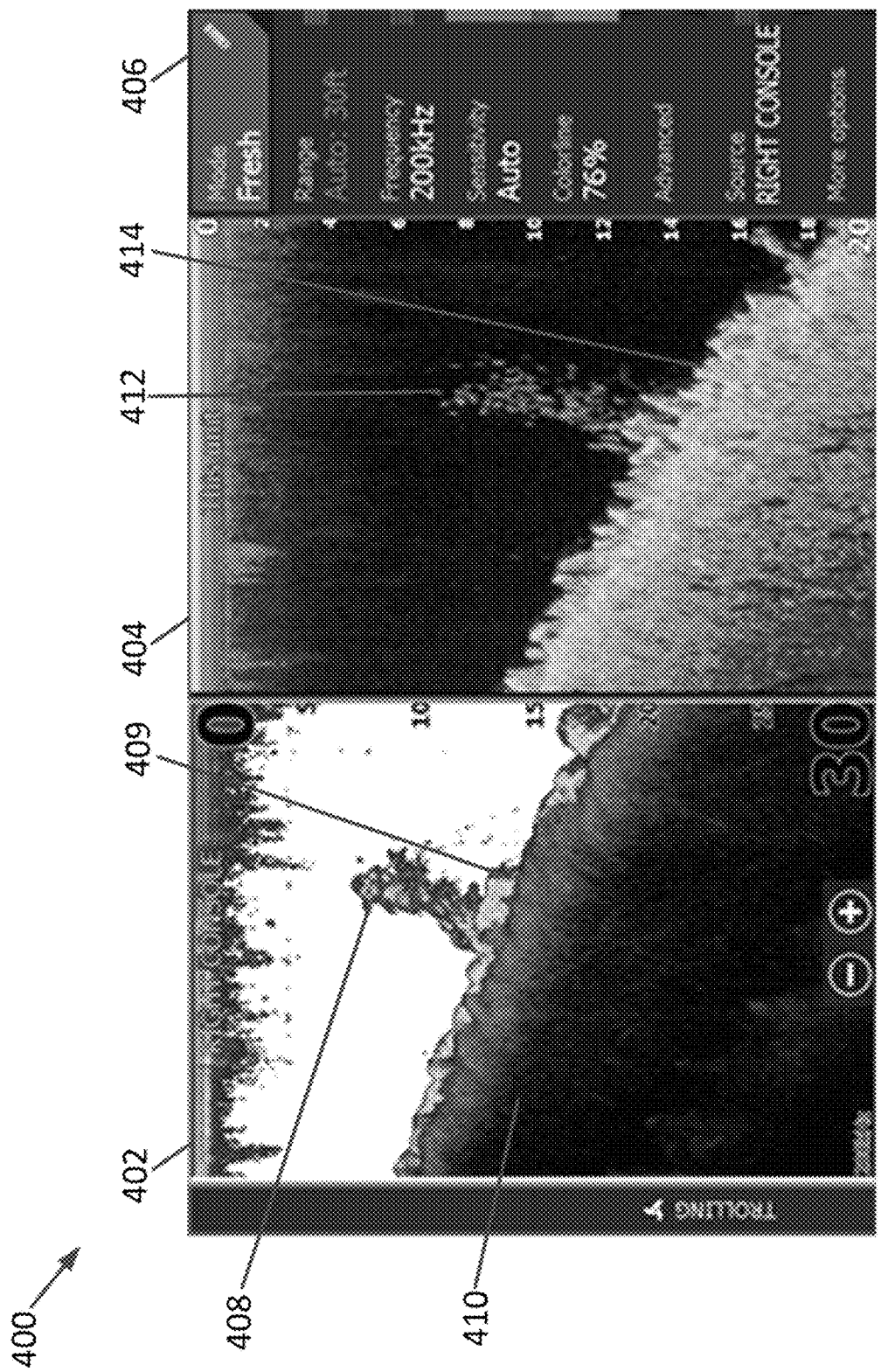
Figure 5:
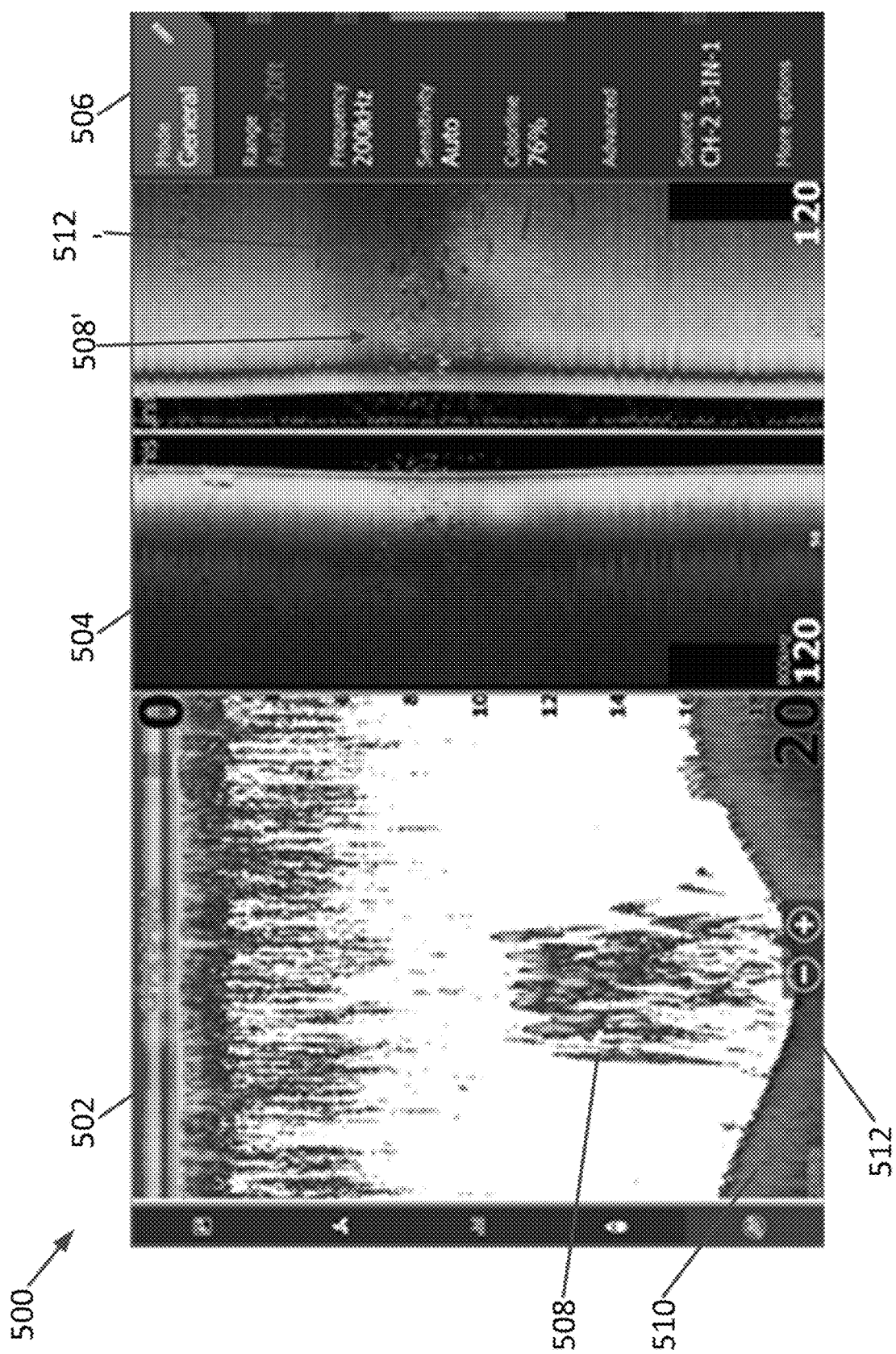
Figure 6B:
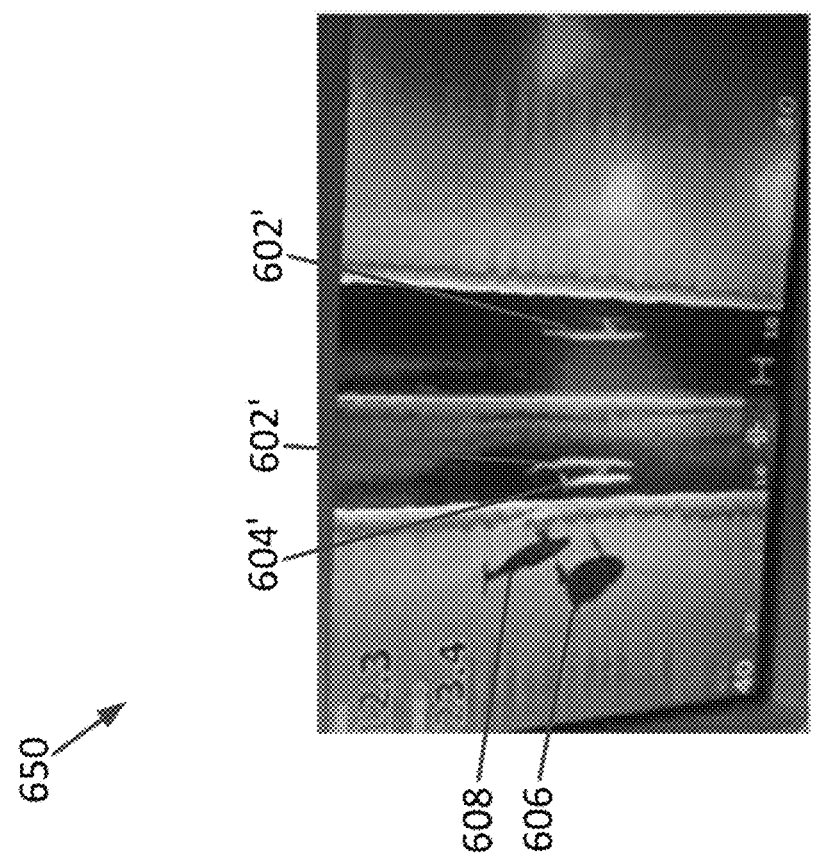
Figure 6A:
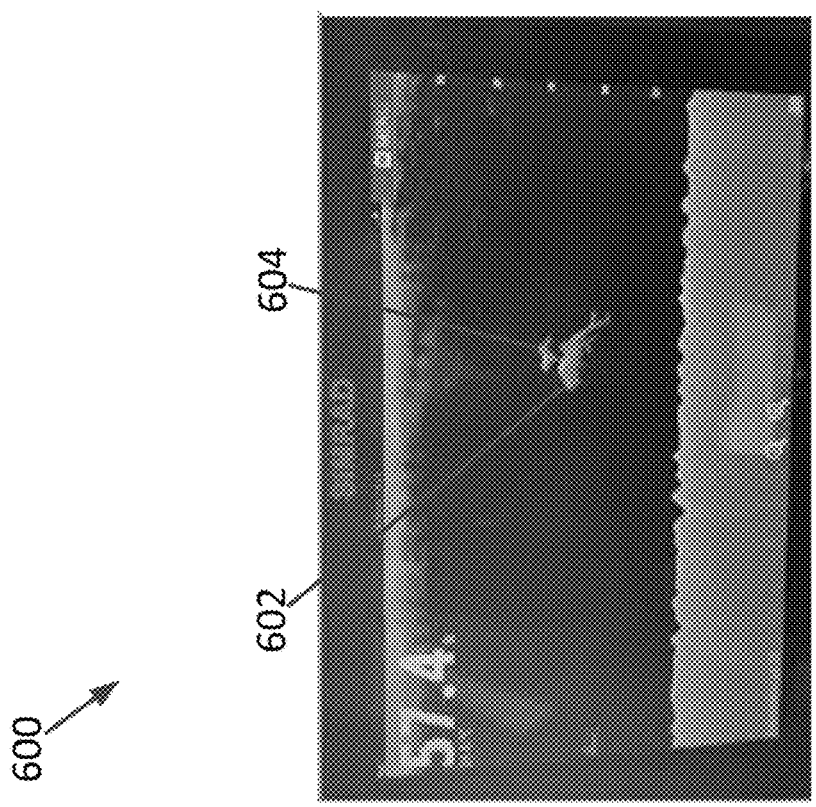
Figure 7:
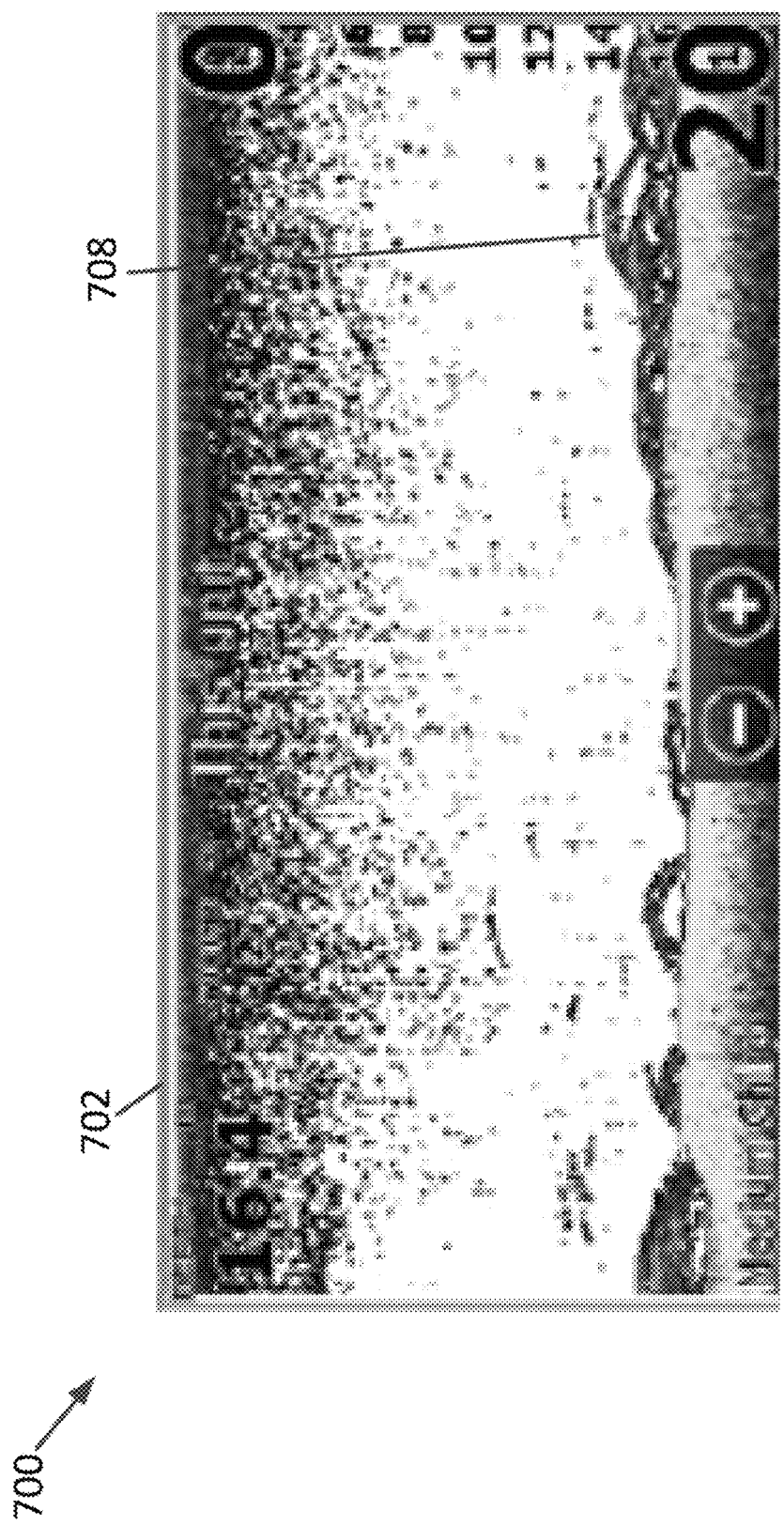
Figure 8:
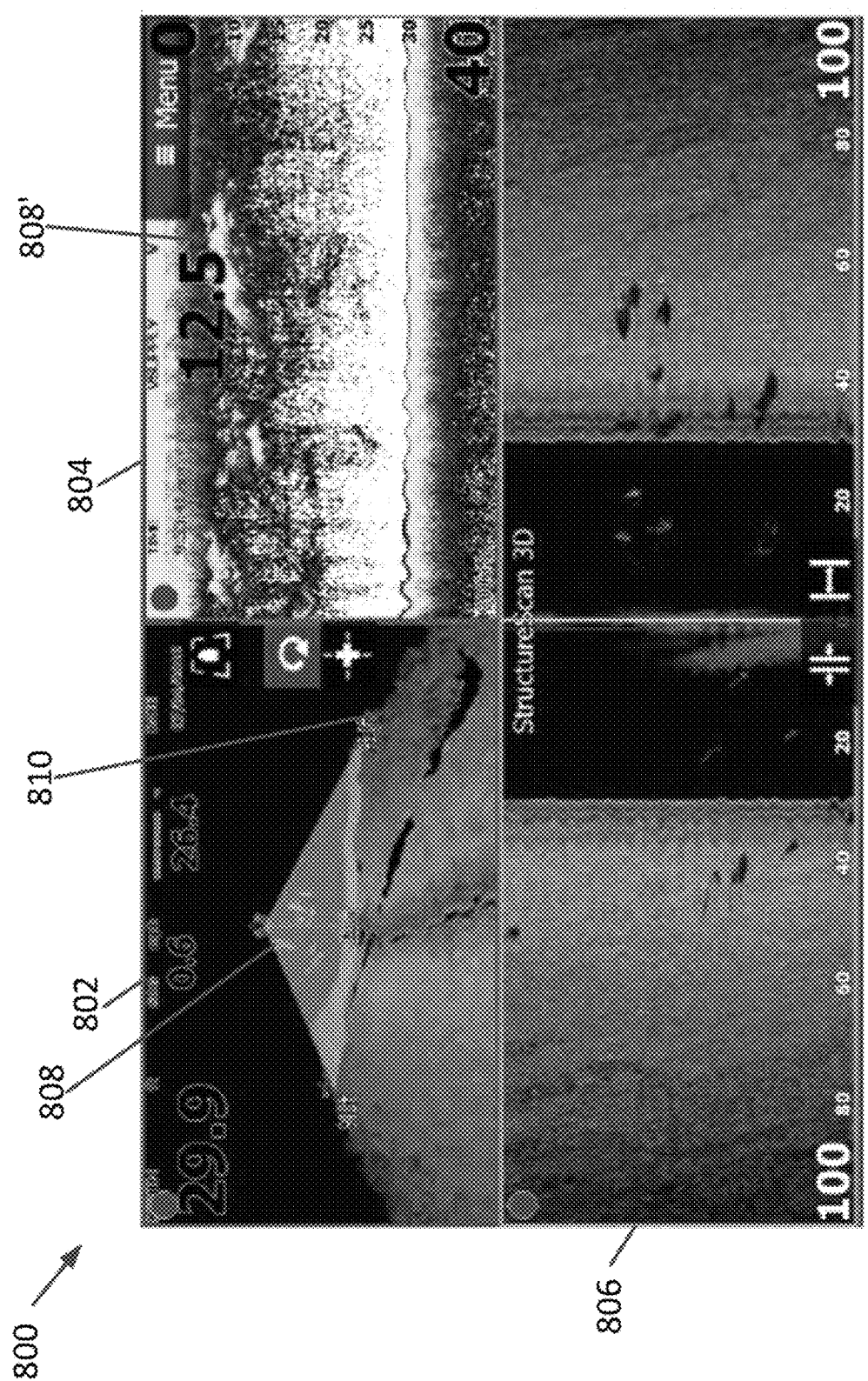
Figure 9:
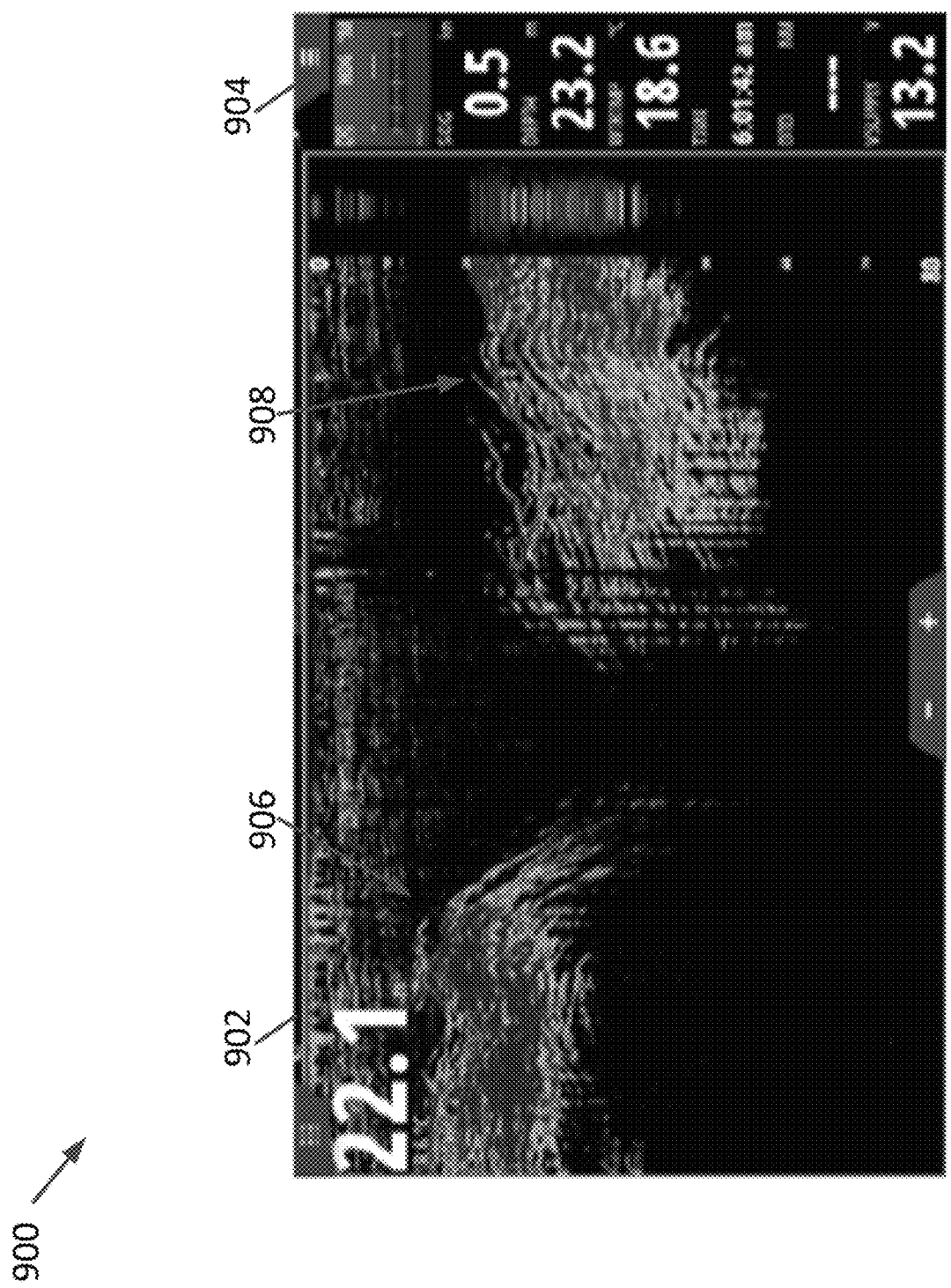
Figure 10B:
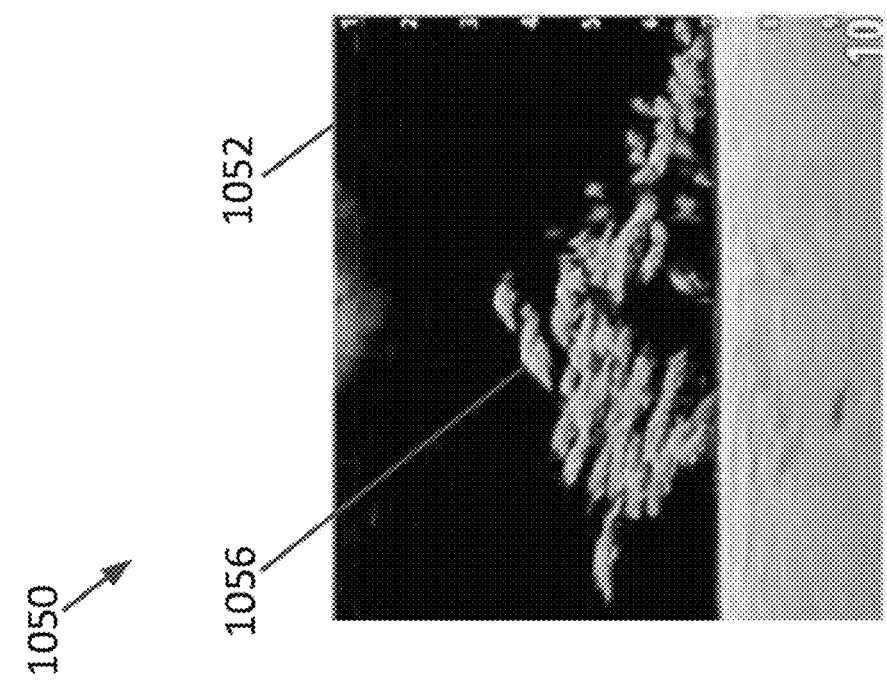
Figure 10A:
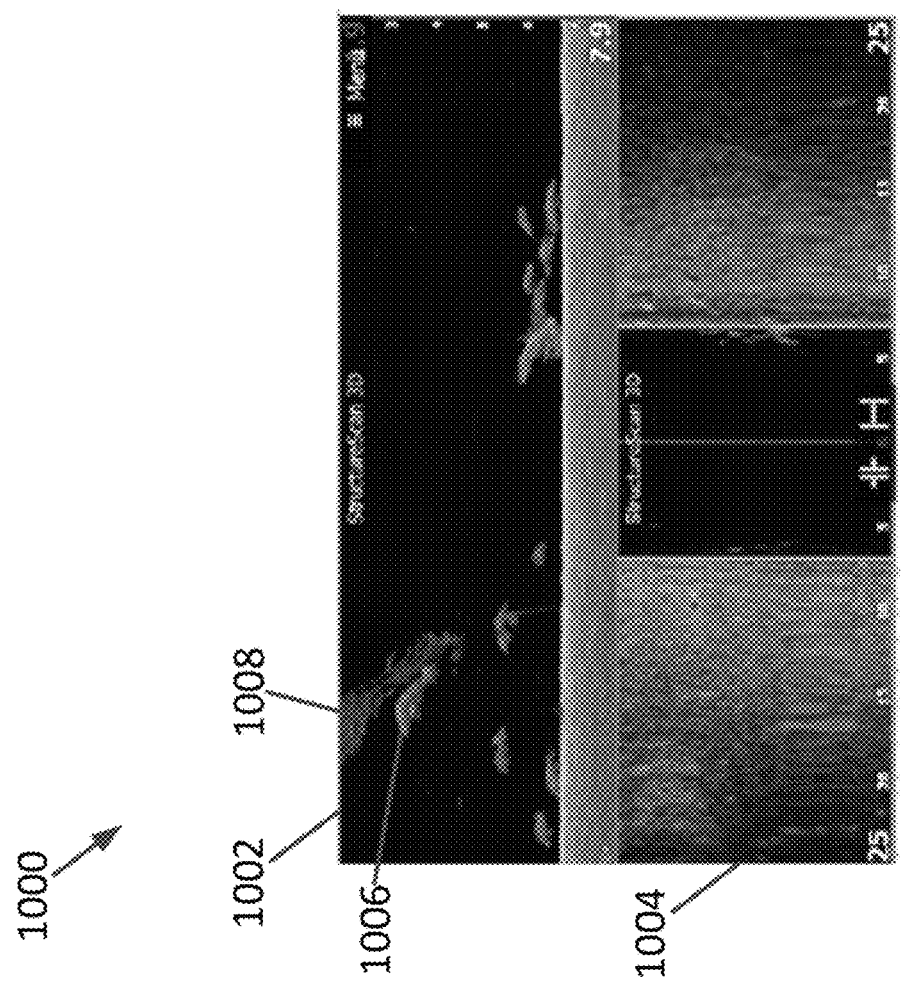
Figure 11:
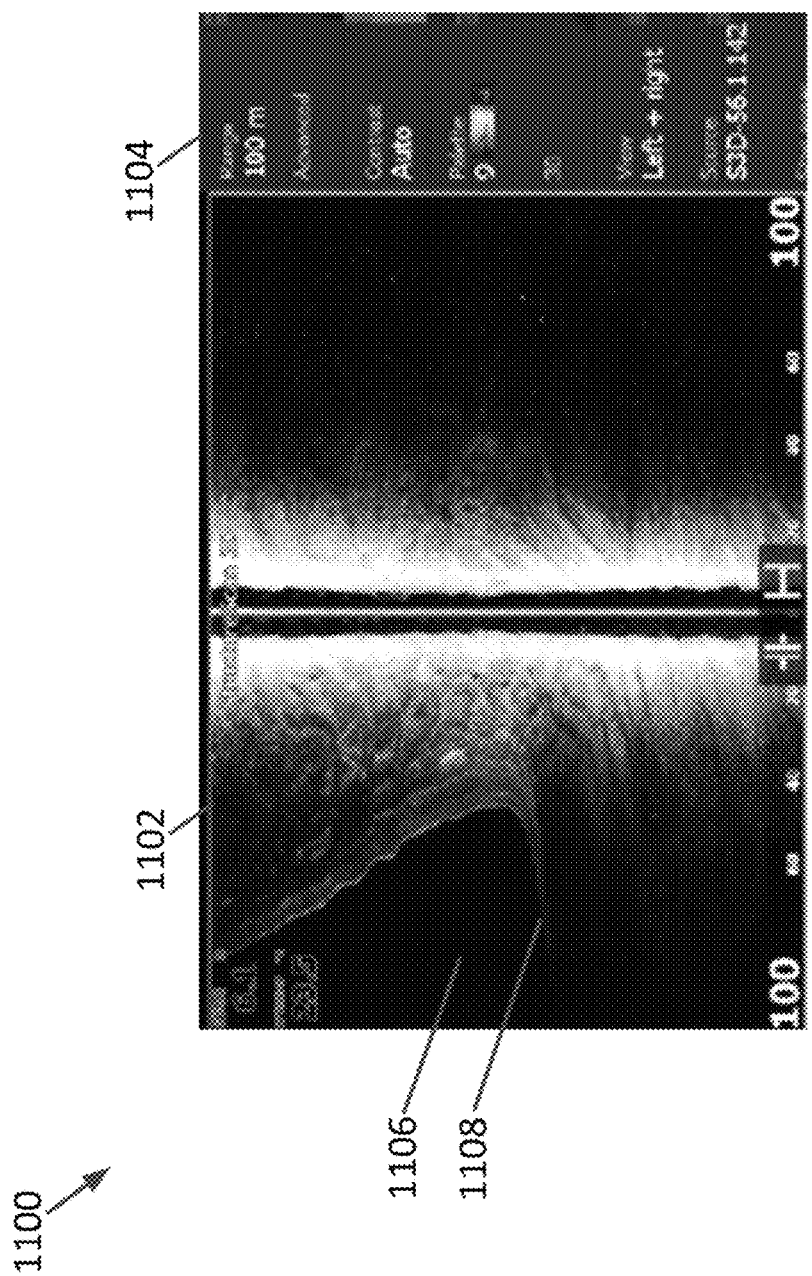
Figure 12:
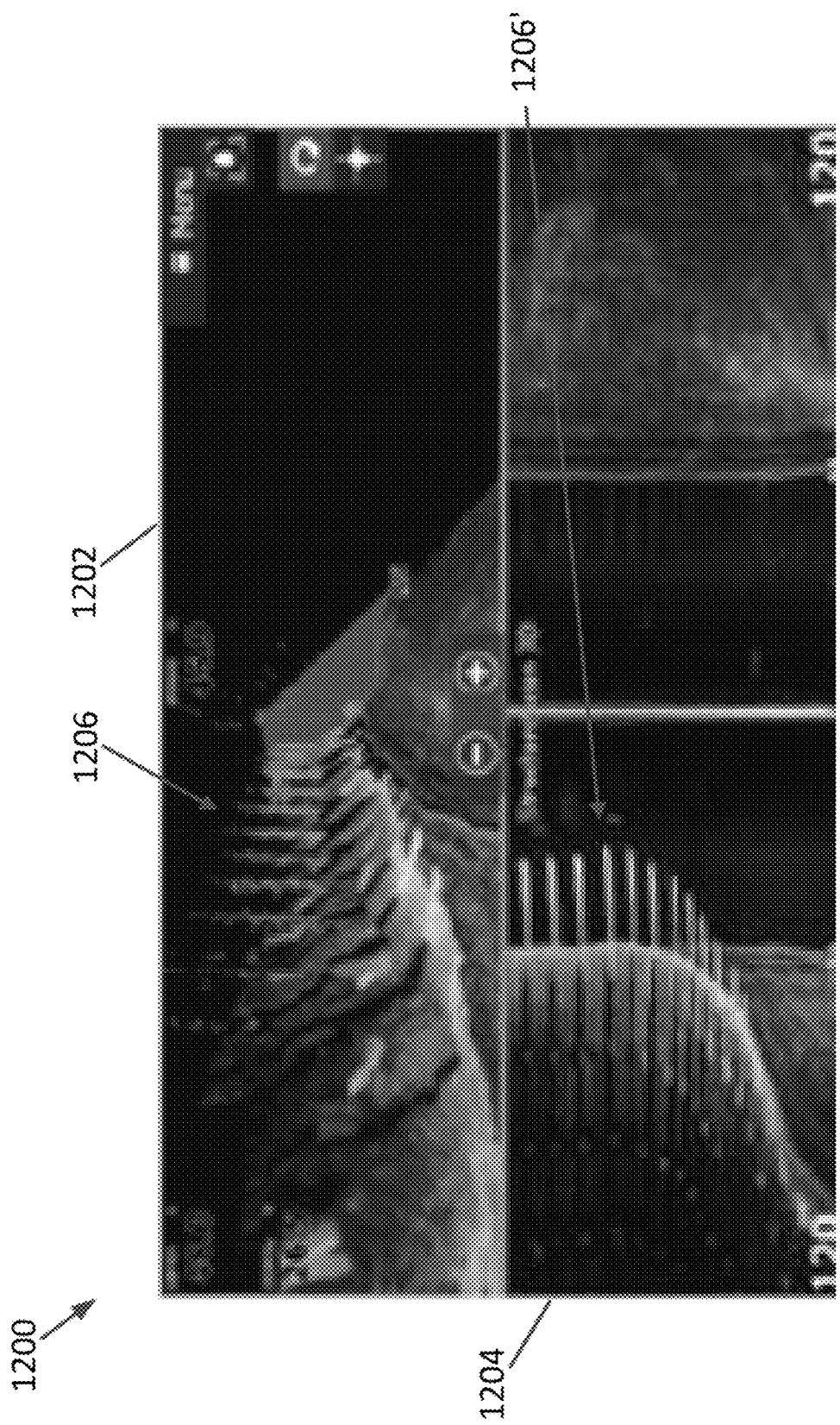
Figure 13:
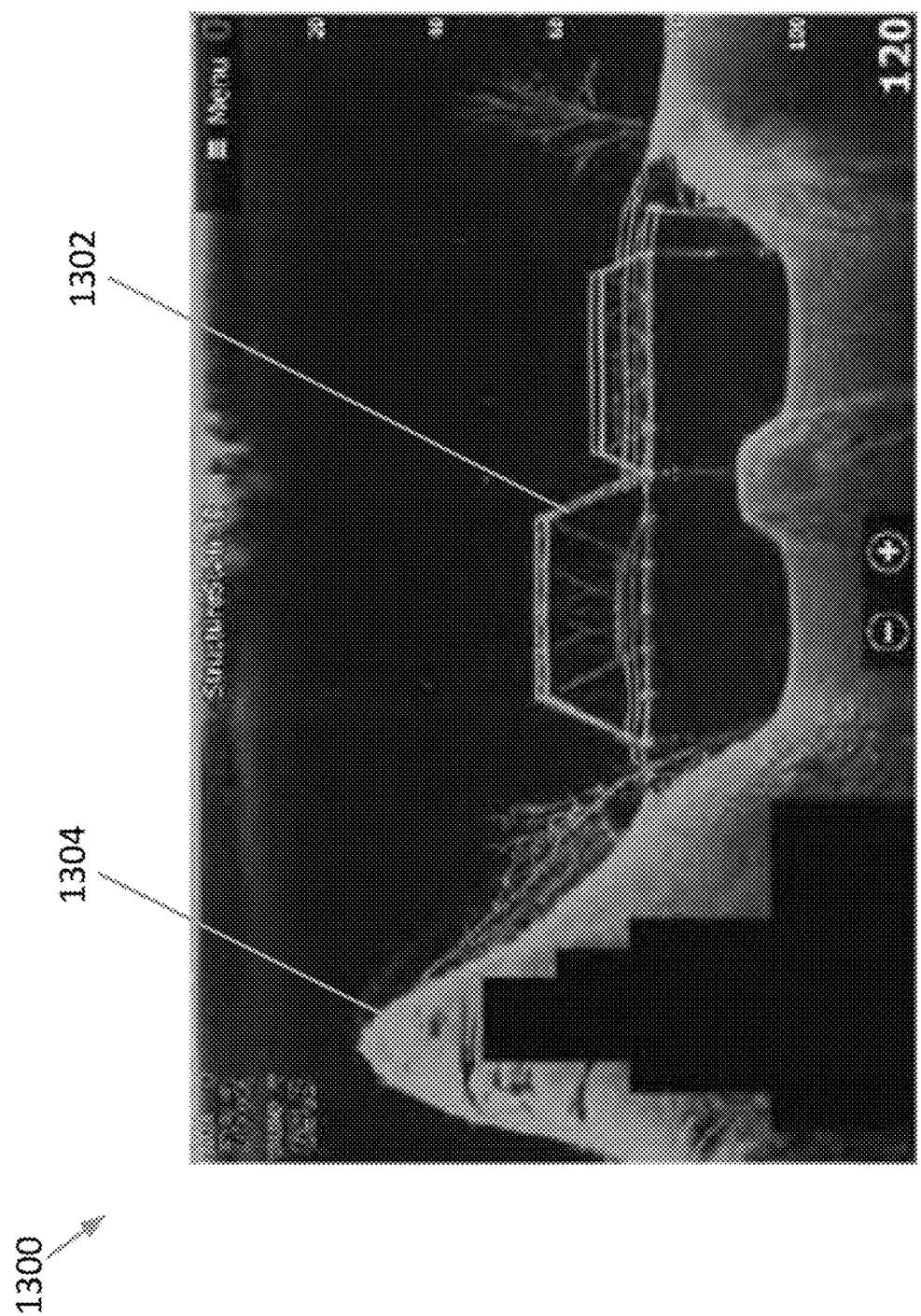
Figure 14:
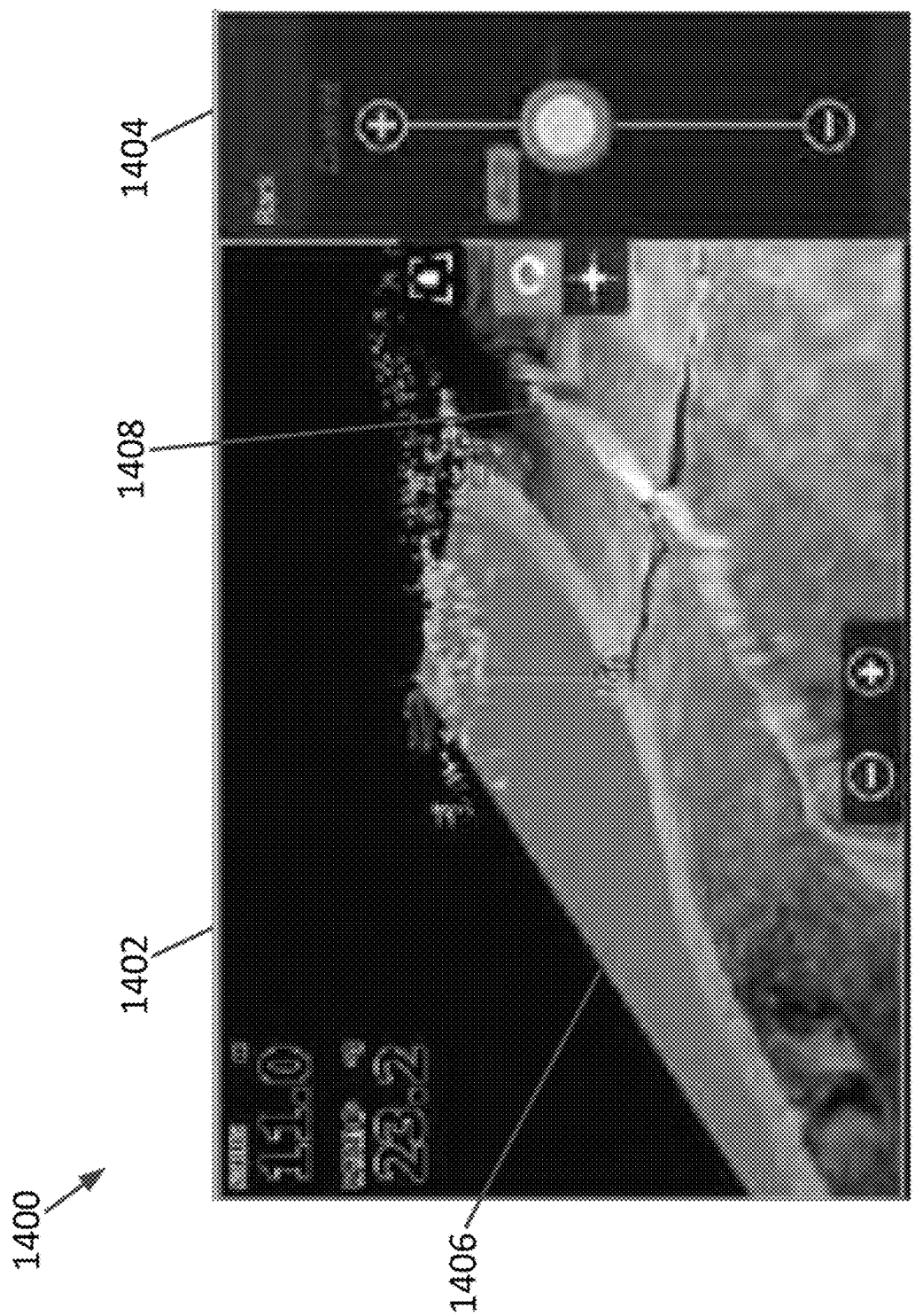
Figure 15:
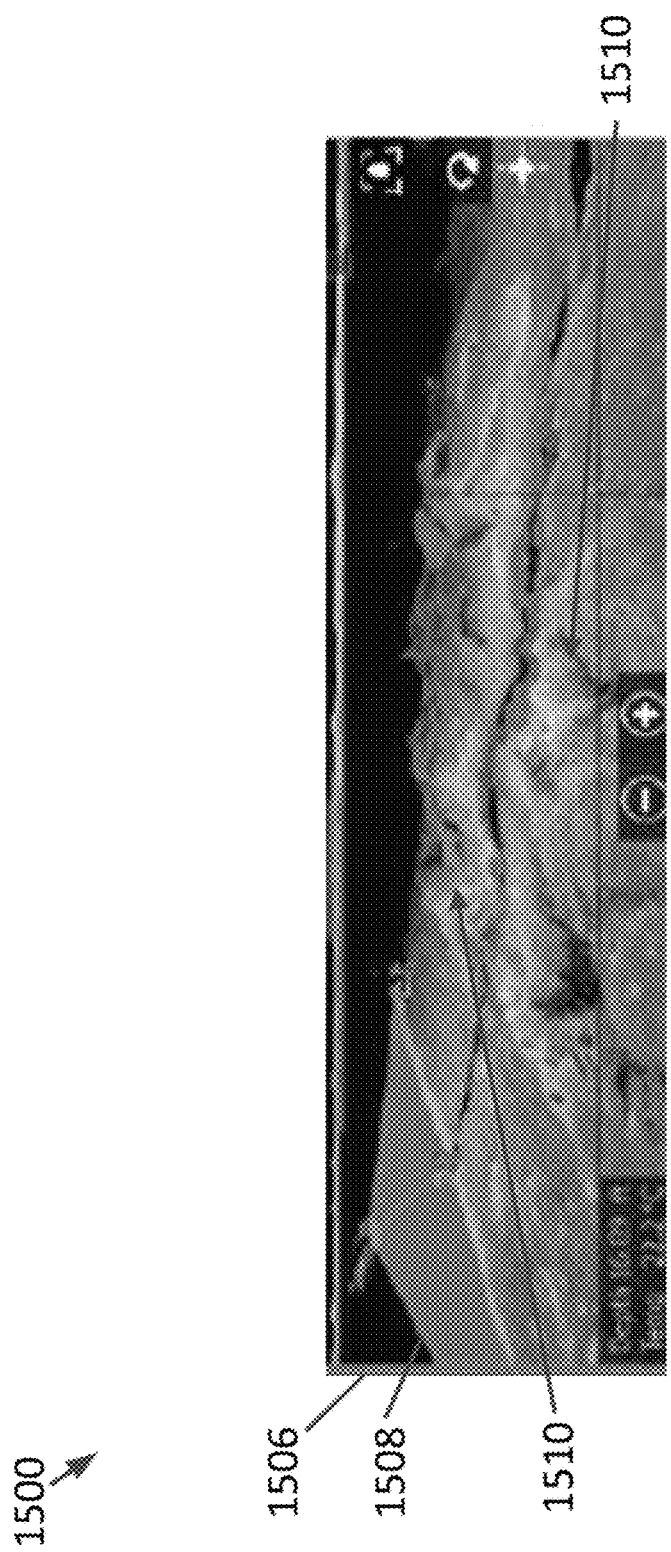
Figure 16:
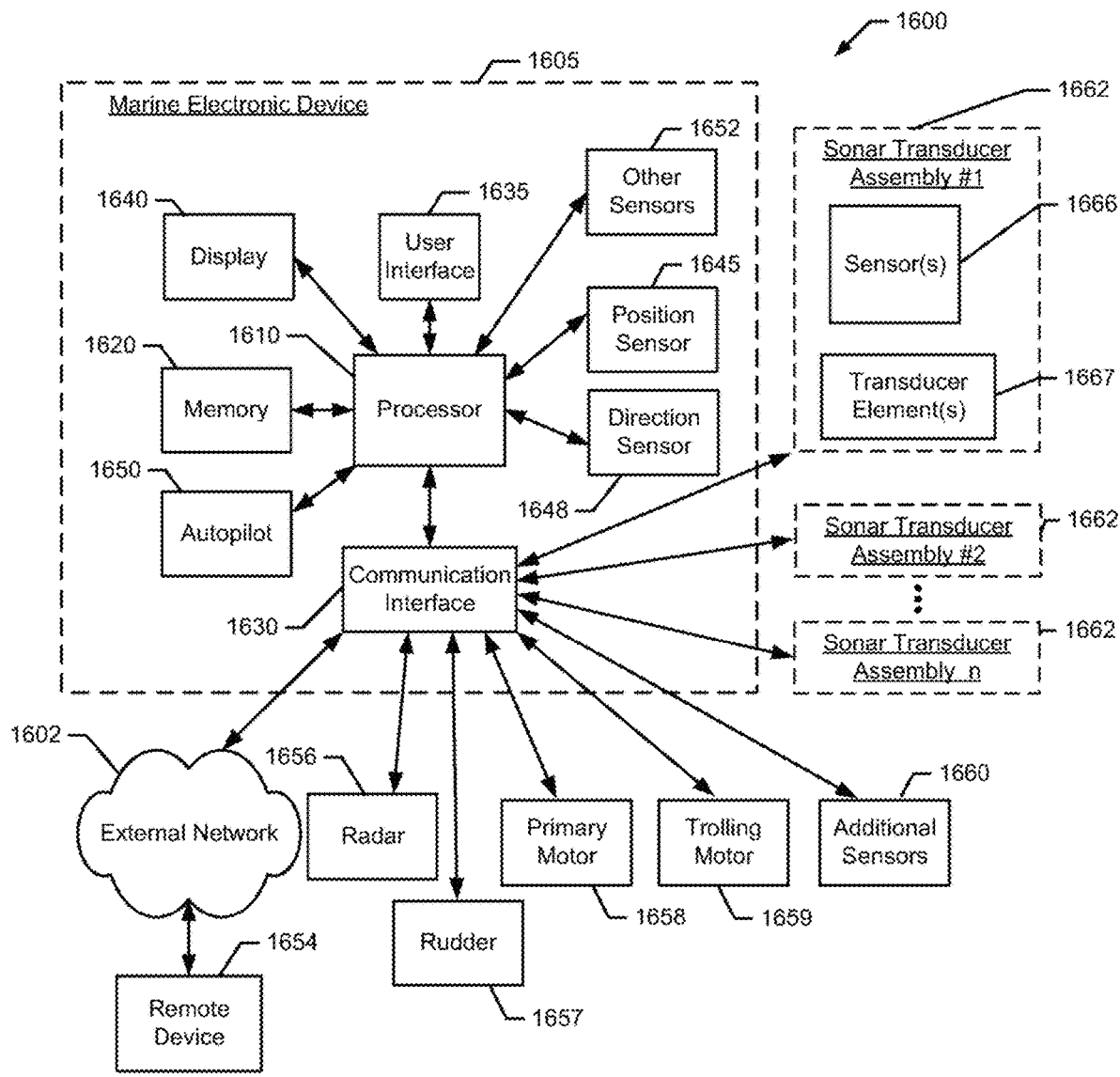

Having thus described the invention in general terms, reference will now be made to the accompanying drawings, which are not necessarily drawn to scale, and wherein:

FIG. 1 illustrates an example watercraft including various marine devices, in accordance with some embodiments discussed herein;

FIG. 2 illustrates a flowchart of an example method of machine learning, in accordance with some embodiments discussed herein;

FIG. 3A-3E illustrate various views of an example display with sonar data and representations of one or more objects, in accordance with some embodiments discussed herein;

FIG. 4 illustrates example sonar images with representations of a school of crappie fish, in accordance with some embodiments discussed herein;

FIG. 5 illustrates example sonar images with representations of a school of bass fish, in accordance with some embodiments discussed herein;

FIGS. 6A and 6B illustrate example sonar images with representations of a whale and a calf, in accordance with some embodiments discussed herein;

FIG. 7 illustrates example sonar images with representations of a school of salmon, in accordance with some embodiments discussed herein;

FIG. 8 illustrates example sonar images with representations of a shark, in accordance with some embodiments discussed herein;

FIG. 9 illustrates an example sonar image with representations of bluefin tuna, in accordance with some embodiments discussed herein;

FIGS. 10A and 10B illustrate example sonar images with representations of barramundi fish, in accordance with some embodiments discussed herein;

FIG. 11 illustrates an example sonar image with representations of a shoreline, in accordance with some embodiments discussed herein;

FIG. 12 illustrates example sonar images with representations of underwater pylons, in accordance with some embodiments discussed herein;

FIG. 13 illustrates an example sonar image with representations of underwater structure, in accordance with some embodiments discussed herein;

FIG. 14 illustrates an example sonar image with representations of an underwater pipeline, in accordance with some embodiments discussed herein;

FIG. 15 illustrates example sonar images with representations of the water floor and fish located at certain locations, in accordance with some embodiments discussed herein;

FIG. 16 illustrates a block diagram of an example system with various electronic devices, marine devices, and secondary devices shown, in accordance with some embodiments discussed herein; and FIGS. 17A-17F illustrate flowcharts with example methods of presenting one or more object characteristics and/or estimated object-types in a display, in accordance with some embodiments discussed herein.

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. Like reference numerals refer to like elements throughout.

FIG. 1 illustrates an example watercraft 100 including various marine devices, in accordance with some embodiments discussed herein. As depicted in FIG. 1, the watercraft 100 (e.g., a vessel) is configured to traverse a marine environment, e.g. body of water 101, and may use one or more sonar transducer assemblies 102a, 102b, and 102c disposed on and/or proximate to the watercraft. Notably, example watercraft contemplated herein may be surface watercraft, submersible watercraft, or any other implementation known to those skilled in the art. The transducer assemblies 102a, 102b, and 102c may each include one or more transducer elements (such as in the form of the example assemblies described herein) configured to transmit sound waves into a body of water, receive sonar returns from the body of water, and convert the sonar returns into sonar return data. Various types of sonar transducers may be provided—for example, a linear downscan sonar transducer, a conical downscan sonar transducer, a sonar transducer array, or a sidescan sonar transducer may be used.

Depending on the configuration, the watercraft 100 may include a primary motor 105, which may be a main propulsion motor such as an outboard or inboard motor. Additionally, the watercraft 100 may include a trolling motor 108 configured to propel the watercraft 100 or maintain a position. The one or more transducer assemblies (e.g., 102a, 102b, and/or 102c) may be mounted in various positions and to various portions of the watercraft 100 and/or equipment associated with the watercraft 100. For example, the transducer assembly may be mounted to the transom 106 of the watercraft 100, such as depicted by transducer assembly 102a. The transducer assembly may be mounted to the bottom or side of the hull 104 of the watercraft 100, such as depicted by transducer assembly 102b. The transducer assembly may be mounted to the trolling motor 108, such as depicted by transducer assembly 102c.

The watercraft 100 may also include one or more marine electronic devices 160, such as may be utilized by a user to interact with, view, or otherwise control various aspects of the various sonar systems described herein. In the illustrated embodiment, the marine electronic device 160 is positioned proximate the helm (e.g., steering wheel) of the watercraft 100 although other places on the watercraft 100 are contemplated. Likewise, additionally or alternatively, a remote device (such as a user's mobile device) may include functionality of a marine electronic device.

The watercraft 100 may also comprise other components within the one or more marine electronic devices 160 or at the helm. In FIG. 1, the watercraft 100 comprises a radar 116, which is mounted at an elevated position (although other positions relative to the watercraft are also contemplated). The watercraft 100 also comprises an AIS transceiver 118, a direction sensor 120, and a camera 122, and these components are each positioned at or near the helm (although other positions relative to the watercraft are also contemplated). Additionally, the watercraft 100 comprises a rudder 110 at the stern of the watercraft 100, and the rudder 110 may be positioned on the watercraft 100 so that the rudder 110 will rest in the body of water 101. In other embodiments, these components may be integrated into the one or more electronic devices 160 or other devices. Another example device on the watercraft 100 includes a temperature sensor 112 that may be positioned so that it will rest within or outside of the body of water 101. Other example devices include a wind sensor, one or more speakers, and various vessel devices/features (e.g., doors, bilge pump, fuel tank, etc.), among other things. Additionally, one or more sensors may be associated with marine devices; for example, a sensor may be provided to detect the position of the primary motor 105, the trolling motor 108, or the rudder 110.

Example Use of Artificial Intelligence

FIG. 2 is a flowchart of an example method 200 of machine learning, such as may be utilized with artificial intelligence for various embodiments of the present invention. At least one processor or another suitable device may be configured to develop a model for the calculation of object characteristics and/or determination of an estimated object-type, such as described herein in various embodiments. In this regard, the developed model may be deployed and utilized to determine object characteristics and/or an estimated object-type for one or more objects that are represented within sonar data. In some embodiments, a marine electronic device 1605 (FIG. 16) may comprise one or more processors that perform the functions shown in FIG. 2.

This system may beneficially determine the expected object characteristics by accounting for sonar data and different types of additional data, and the developed model may assign different weights to different types of data that are provided. In some systems, even after the model is deployed, the systems may beneficially improve the developed model by analyzing further data points. By utilizing artificial intelligence, a novice user may benefit from the experience of the models utilized, making marine activities more user friendly and accessible/successful for beginners.

Embodiments beneficially allow for accurate information to be provided about the objects represented within sonar data and also allow for information about these objects to be shared with the user (such as on the display) so that the user may make well-informed decisions. Additionally, the techniques may also enable displays that allow novice users to quickly and easily decipher sonar data. Utilization of the model may prevent the need for a user to spend a significant amount of time reviewing sonar data and other information, freeing the user to perform other tasks and enabling performance and consideration of complex estimations and computations that the user could not otherwise solve on their own (e.g., the systems described herein may also be beneficial for even the most experienced users).

By receiving several different types of data, the example method 200 may be performed to generate complex models. The example method 200 may find relationships between different types of data that may not have been anticipated. By detecting relationships between different types of data, the method 200 may generate accurate models even where a limited amount of data is available.

In some embodiments, the model may be continuously improved even after the model has been deployed. Thus, the model may be continuously refined based on changes in the systems or in the environment over time, which provides a benefit as compared with other models that stay the same after being deployed. The example method 200 may also refine the deployed model to fine-tune weights that are provided to various types of data based on subtle changes in the watercraft and/or the environment. Where certain parts of the watercraft are replaced, modified, or damaged or where there are swift changes in the environment, the method 200 may continuously refine a deployed model to quickly account for the changes and provide a revised model that is accurate. By contrast, where a model is not continuously refined, changes to the watercraft or the surrounding environment may make the model inaccurate until a new model may be developed and implemented, and implementation of a new model may be very costly, time-consuming, and less accurate than a continuously refined model.

At operation 202, one or more data points are received. These data points may or may not be the initial data points being received. These data points preferably comprise known data on an object-type, animal-type, fish-type, or some other object characteristic that the model may be used to predict. For example, where the model is being generated to provide an estimated object-type for an object, the data points provided at operation 202 will preferably comprise known data that corresponds to the object-type of the object. The data points provided at operation 202 will preferably be historical data points with verified values to ensure that the model generated will be accurate. The data points may take the form of discrete data points. However, where the data points are not known at a high confidence level, a calculated data value may be provided, and, in some cases, a standard deviation or uncertainty value may also be provided to assist in determining the weight to be provided to the data value in generating a model. In this regard, the model predicted object characteristic and/or predicted object-type may be formed based on historical comparisons of the sonar data and additional data.

For example, the model may be formed based on historical comparisons of a historical object-type with historical sonar data and historical additional data, and a processor may be configured to utilize the developed model to determine an estimated object-type for an object represented in sonar data. This model may be developed through machine learning utilizing artificial intelligence based on the historical comparisons of the historical object-type with historical sonar data and historical additional data. Alternatively, a model may be developed through artificial intelligence, and the model may be formed based on historical comparisons of additional data and the sonar data. A processor may be configured to use the model and input the sonar data and the additional data into the model to determine the one or more object characteristics.

Another example of appropriate historical comparisons may include comparing additional data (e.g., geographical data from maps or nautical charts, temperature data, time data, etc.) with sonar return data. Additional data may be provided from a variety of sources, and additional data may, for example, be provided from a camera, a radar, a thermometer, a clock, a pressure sensor, a direction sensor, or a position sensor.

At operation 204, a model is improved by minimizing error between a predicted object characteristic and/or estimated object-type generated by the model and an actual object characteristic and/or object-type for data points. In some embodiments, an initial model may be provided or selected by a user. The user may provide a hypothesis for an initial model, and the method 200 may improve the initial model. However, in other embodiments, the user may not provide an initial model, and the method 200 may develop the initial model at operation 204, such as during the first iteration of the method 200. The process of minimizing error may be similar to a linear regression analysis on a larger scale where three or more different variables are being analyzed, and various weights may be provided for the variables to develop a model with the highest accuracy possible. Where a certain variable has a high correlation with the actual object characteristic and/or object-type, that variable may be given increased weight in the model. For example, where data from maps or nautical charts are available, that data may be provided alongside with sonar data, and the model may be optimized to give the map data its appropriate weight. In refining the model by minimizing the error between the predicted object characteristic and/or object-type generated by the model and the actual or known object characteristic and/or object-type, the component performing the method 200 may perform a very large number of complex computations. Sufficient refinement results in an accurate model.

In some embodiments, the accuracy of the model may be checked. For example, at operation 206, the accuracy of the model is determined. This may be done by calculating the error between the model predicted object characteristic and/or object-type generated by the model and the actual object characteristic and/or object-type from the data points. In some embodiments, error may also be calculated before operation 204. By calculating the accuracy or the error, the method 200 may determine if the model needs to be refined further or if the model is ready to be deployed. Where the object characteristic and/or object-type is a qualitative value or a categorical value such as a type of fish or a type of object, the accuracy may be assessed based on the number of times the predicted value was correct. Where the object characteristic and/or object-type is a quantitative value, the accuracy may be assessed based on the difference between the actual value and the predicted value.

At operation 208, a determination is made as to whether the calculated error is sufficiently low. A specific threshold value may be provided in some embodiments. For example, where the object characteristic is a depth, the threshold may be 0.1 meters, and the calculated error may be sufficiently low if the average error is less than or equal to 0.1 meters. However, other threshold values may be used, and the threshold value may be altered by the user in some embodiments. If the error rate is not sufficiently low, then the method 200 may proceed back to operation 202 so that one or more additional data points may be received. If the error rate is sufficiently low, then the method 200 proceeds to operation 210. Once the error rate is sufficiently low, the training phase for developing the model may be completed, and the implementation phase may begin where the model may be used to predict the expected object characteristic and/or object-type.

By completing operations 202, 204, 206, and 208, a model may be refined through machine learning utilizing artificial intelligence based on the historical comparisons of additional data and sonar data and based on known deviations of the sonar data for the historical comparisons. Notably, example model generation and/or refinement may be accomplished even if the order of these operations is changed, if some operations are removed, or if other operations are added.

During the implementation phase, the model may be utilized to provide a determined object characteristic and/or an estimated object-type. An example implementation of a model is illustrated from operations 210-212. In some embodiments, the model may be modified (e.g., further refined) based on the received data points, such as at operation 214.

At operation 210, further data points are received. For these further data points, the object characteristic and/or object-type may not be known. At operation 212, the model may be used to provide a predicted output data value for the further data points. Thus, the model may be utilized to determine the object characteristic and/or the estimated object-type.

At operation 214, the model may be modified based on supplementary data points, such as those received during operation 210 and/or other data points. For example, the model may be refined utilizing the sonar data, additional data, and the determined object characteristics and/or object-types, such as described herein. By providing supplementary data points, the model can continuously be improved even after the model has been deployed. The supplementary data points may be the further data points received at operation 210, or the supplementary data points may be provided to the processor from some other source. In some embodiments, the processor(s) or other component performing the method 200 may receive additional data from secondary devices and verify the further data points received at operation 210 using this additional data. By doing this, the method 200 may prevent errors in the further data points from negatively impacting the accuracy of the model.

In some embodiments, supplementary data points are provided to the processor from some other source and are utilized to improve the model. For example, supplementary data points may be saved to a memory 1620 (FIG. 16) associated with at least one processor 1610 via communication interface 1630, or the supplementary data points may be sent through the external network 1602 from a remote device 1654. These supplementary data points may be verified before being provided to the at least one processor 1610 to improve the model, or the at least one processor 1610 may verify the supplementary data points utilizing additional data.

As indicated above, in some embodiments, operation 214 is not performed and the method proceeds from operation 212 back to operation 210. In other embodiments, operation 214 occurs before operation 212 or simultaneous with operation 212. Upon completion, the method 200 may return to operation 210 and proceed on to the subsequent operations. Supplementary data points may be the further data points received at operation 210 or some other data points.

Example Determinations and Data Usage

As indicated herein, in some embodiments, the system may be configured to determine one or more object characteristics of an object represented within sonar data. The system may determine the one or more object characteristics through the use of the artificial intelligence techniques described above, or the system may determine these object characteristics through other approaches, such as through an algorithmic approach.

In some embodiments, the system may be configured to determine that an object is within the sonar data. For example, the sonar data may include various sonar signal returns that comprise an amplitude, a time of flight (e.g., time of reflection of the signal), a receipt time (e.g., when the sonar signal was received), and an angular direction (e.g., relative to the direction of the sonar, watercraft, and/or waterline). Individual sonar signal returns may be captured in memory and used to identify objects within the sonar data. In some embodiments, a cluster of similar sonar signal returns may be used to determine occurrence of an object (e.g., via the amplitude and angular direction/time of flight). In some embodiments, relative movement of a grouping of sonar signal returns across different receipt times may be used to determine an object within the sonar data. In some embodiments, additional data (e.g., automatic identification system (AIS) data, weather data, other sonar data, historical data, chart data, etc.) may be used to determine that a group of sonar signal returns correspond to an object within the sonar data.

Once the object is determined, the system may utilize additional data to determine one or more object characteristics (e.g., the type of object, velocity of the object, etc.). For example, data points may comprise sonar data and/or other additional data (including historical data); and the data points may be provided to develop a model that may predict object characteristics and/or an object-type for objects that are represented in the sonar data. For example, sonar data may be provided alongside other additional data such as weather data, data from maps and nautical charts, and AIS data, and used to determine object characteristics that may be used to determine an estimated object-type for the object. Various types of additional data may be provided—for example, humidity data, temperature data, pressure data, precipitation data, water current data, weather data, sonar data, GPS data, compass data, heading sensor data, position data for a watercraft, directional data for a watercraft, directional data from a motor or a rudder of a watercraft, image data from a camera, data regarding the date or time, navigational data, and/or geographical data may be provided. Such additional data may be gathered from various sources, including remotely-located sources (e.g., an external network (cloud)—such as from satellites, weather gathering services, fish locating applications, AIS, etc.). Using the sonar data and the additional data, the system may determine the estimated object-type that is being represented within the display.

In some instances, determining the type of object may be difficult as two or more objects may be located at the same position. For example, different types of fish may be represented in sonar data at the same location (e.g., depth and/or relative distance from the sonar transducer assembly). Alternatively, a fish may be located above structure. Where two or more objects are located at the same position, this may cause the sonar data presented in the display at that location to have a high intensity relative to other locations within the display. Through the use of data from different types of sonar images, data from sonar images presented over time, and additional data, the outline of objects may be determined so that two different objects may be readily distinguished. Additional data may be used alongside the available sonar data to develop and improve a model that may predict the outline of the objects and distinguish between the two different types of objects. As a greater amount of data points are provided to the model, the accuracy of the model may be further improved.

In some embodiments, known historical data may be provided to help improve the model. For example, known historical data may be provided for the elevation of an ocean floor or known historical data may be provided for other physical underwater structure, and the model generated outline for the ocean floor or the physical underwater structure may be compared to the known historical data. By providing sufficient data to the model, the model may be improved over time. Data from geographical maps and nautical charts may also be compared to sonar data to determine the object type by a process of elimination. For example, where sonar data detects an object, and that object is not found within geographical maps or nautical charts, the model may determine by process of elimination that the object is most likely an underwater animal or some other loose object.

In some embodiments, the outline of the object may be detected by recognizing time-based patterns in the movement of the objects. This may be done through the use of Long Short-Term Memory ("LSTM") networks to recognize patterns in sequences of data. Where two objects are overlapping within sonar data, LSTM networks may be used to identify the movement of one object with respect to the other object. For example, where a fish is swimming above certain structure that is being represented in sonar data in a downscan image, LSTM networks may recognize a change in the intensity of the sonar data over time and associate this changing intensity with the movement of the fish. Additionally, if enough data is retained, the outline of the fish may be known from previous sonar images where the fish and the structure do not overlap.

Where the model is being used to determine the speed of a fish or the speed of another type of object, different data types may be more prevalent in the model. For example, for determining the velocity of a fish, past locations of the fish and the water current velocity may have a strong correlation to the actual velocity of the fish. However, other data types may also show a correlation and may be considered in the model to improve the accuracy of the model.

Other object characteristics may also be determined for various objects represented within a display. For example, the velocity or the direction that the object is heading may be determined based on (1) a comparison of previously determined locations and the most recently obtained location of the object to determine an object path of the object, wherein the locations are obtained from a source such as AIS or sonar; and/or (2) the speed of a water current at the watercraft of the user or the water current speed at the object location. Other data may also be used to determine the velocity and movement direction of the object, such as the region, the time of day and time of year, water pressure, etc.

As another example, various determinable object characteristics may be related to fish within the sonar data. For example, the range, bearing, and/or speed of the fish targets may be determined by such example systems. In some embodiments, the type of fish may be determined using additional data, such as the current region, the time of year, speed of the fish, etc.

As yet another example, the determined object characteristics may be specific safety related alerts or data corresponding to the object. These may be particularly useful where the object is some underwater structure or an elevated floor that may present danger to a watercraft. For example, the appropriate distance to stay away from the object may be determined and displayed, a corresponding recommended action by the watercraft (e.g., change course, call for help, etc.) may be determined and displayed, among other things. If there is a corrective action, in some embodiments, the autopilot may be automatically engaged.

Additional data may be provided in various forms to assist with determining different object characteristics. Additional data may be provided in the form of humidity data, temperature data, pressure data, precipitation data, water current data, weather data, radar data, GPS data, compass data, heading sensor data, position data for a watercraft, directional data for a watercraft, directional data from a motor or a rudder of a watercraft, image data from a camera, data regarding the date or time, navigational data, or geographical data. However, other types of data may also be provided. Using the additional data and various data types that are available, an accurate model may be developed. Some data types may have a negligible correlation to a specific object characteristic and may not be considered in the model. However, where a large number of data types are available, the system may beneficially find an unexpected correlation between one data type and a desired object characteristic. Thus, a large number of different data types may preferably be used.

Accordingly, in some embodiments, once the object characteristics are determined, one or more estimated object-types based on the object characteristics may be determined (notably, in some embodiments, the estimated object-types may be determined without determining one or more object characteristics). In some embodiments, the estimated object-type may be determined based on more than one object characteristic. The determination of the estimated object-type may be performed in an algorithmic manner and/or via artificial intelligence. In this regard, as described herein, a model may utilize historical matching of known object characteristics with object-types to find matches and probabilities that enable determination of an estimated object-type for the object represented in the sonar image. Some example correlations are described further herein.

In some embodiments, any number of object characteristics can be used, and correlation patterns of object characteristics can be utilized to determine an estimated object-type. In this regard, various patterns of object characteristics can lead to determination of estimated object-types. Some example object characteristics that can be determined and then utilized to determine an estimated object-type include at least one of a shape of the object, a depth of the object, an environment of the object, a velocity of the object, a temperature of the water, an intensity of the sonar data, an intensity of the additional data, a behavior of the object, a geographical area, a time of day, or a time of year. In this regard, the correlated patterns of object characteristics lead to a determination of an estimated object-type (e.g., a type of fish) that can then be provided to the user for useful (and easy) sonar interpretation.

Example Displays and Features

FIGS. 3A-3E illustrate an example display and various views that may be presented on the example display. The improved displays shown in these embodiments may assist novice users to be able to quickly view and synthesize information from the display so that decisions can be made quicker and more accurately. The improved displays of the embodiments present information in a way that is more easily understandable. The improved display may be used in conjunction with the artificial intelligence techniques described herein to promptly and accurately provide the user with information about the environment of the watercraft and the various objects around the watercraft in ways that are easy to understand.

FIGS. 3A-3E illustrate an example display and various views that may be presented on the example display. Such example images may be presented on one or more displays associated with a watercraft (e.g., the display 1640 described with respect to FIG. 16, a remote display, such as a user's mobile device, etc.). Some such example displays may present sonar data as well as other information about objects represented within the sonar data. The displays may present information about objects in a readily understandable manner so that users are equipped to make well-informed decisions, and the displays may help emphasize certain representations of objects and/or distinguish the representations so that the user may quickly and easily interpret the sonar data.

Figure 3A:
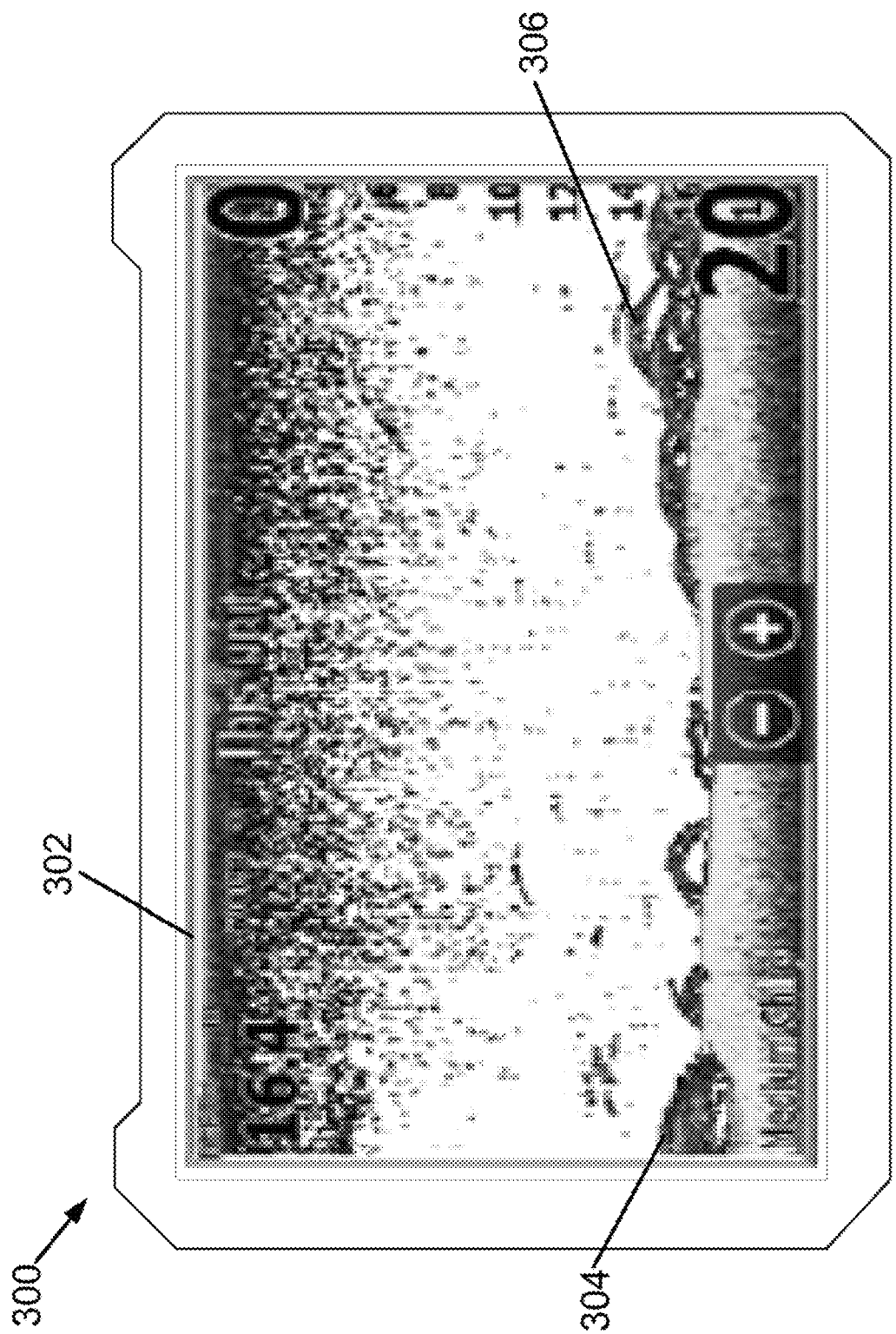

FIG. 3A illustrates the example display 300, wherein the example display 300 is illustrating downscan sonar data in a first area 302. However, other types of data may be presented as well, including but not limited to other views of sonar data, radar data, and navigational maps. Various objects may be represented within the first area 302, and these objects may include fish or other underwater animals, elevations or depressions in the floor of the water, underbrush, other structure such as a pipeline or debris, etc. In FIG. 3A, a representation of a first object 304 and a representation of a second object 306 are illustrated. In this embodiment, the first object 304 and the second object 306 are both salmon fish.

Figure 3B:
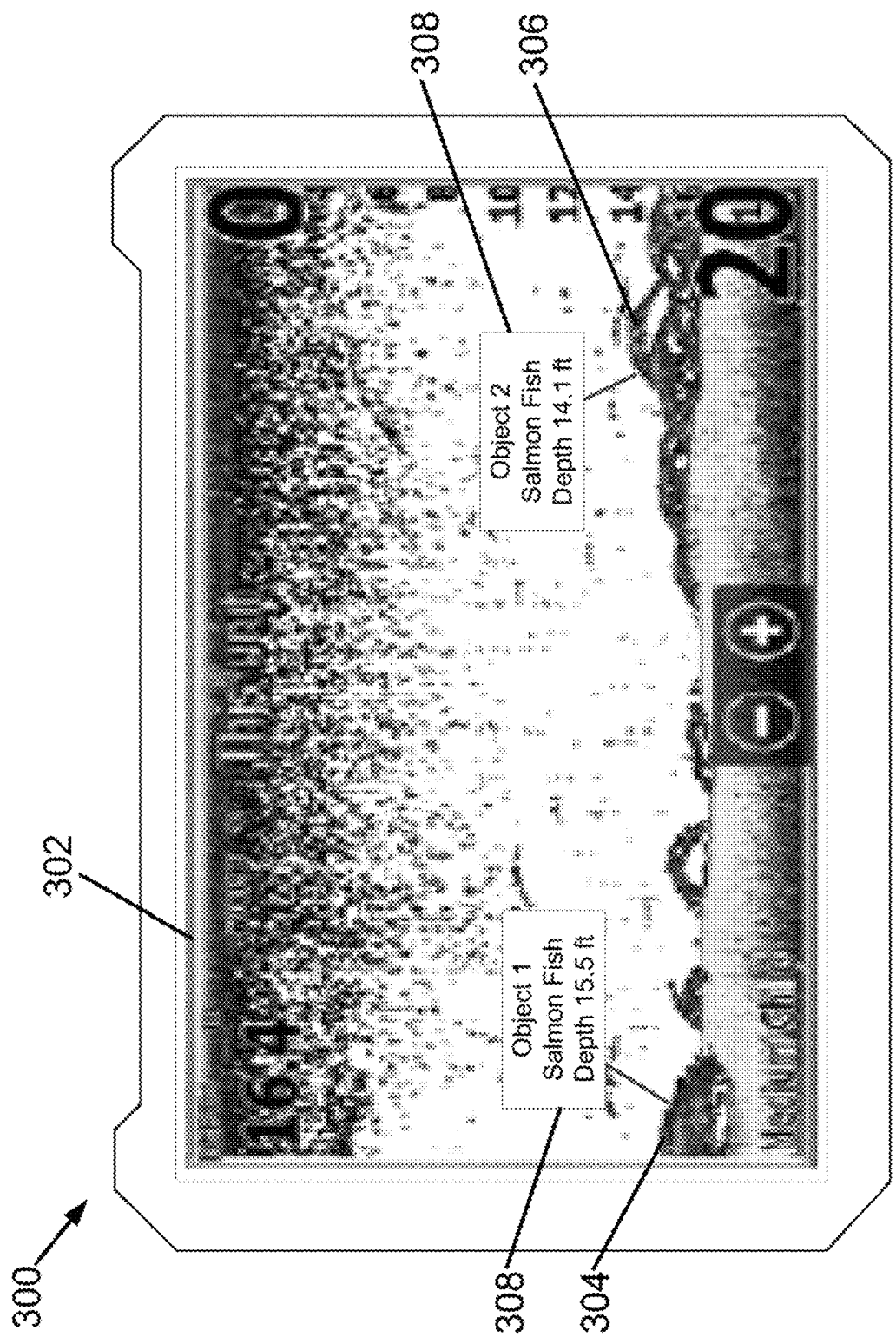

FIGS. 3B-3E present various embodiments with different approaches for providing information about the objects that are represented within the display 300. As demonstrated herein, this information may be provided in a variety of ways, and other approaches may be adopted for providing information about the objects that are represented within the display. FIG. 3B presents an example display 300 with first window 308 provided that comprises one or more indications regarding the various objects that are illustrated in the first area 302 (e.g., estimated object-type ("Salmon Fish"), depth, etc.). In FIG. 3B, the depth of each of the objects is indicated. Additionally, the type of object is presented, showing that the first object 304 and the second object 306 are both salmon fish. The first window 308 may instead show that the first object 304 and the second object 306 are simply animals or fish without specifying the type of fish. In FIG. 3B, the indications shown in the first window 308 are provided automatically without any need for user input. However, in other embodiments, such as in FIG. 3A, no indication is provided automatically, and additional information may be presented only upon a user input requesting that information. In FIG. 3B, the indications are presented in a first window 308 within the first area 302 along with sonar data so that the indications are presented proximate to the representation of the relevant object.

Figure 3C:
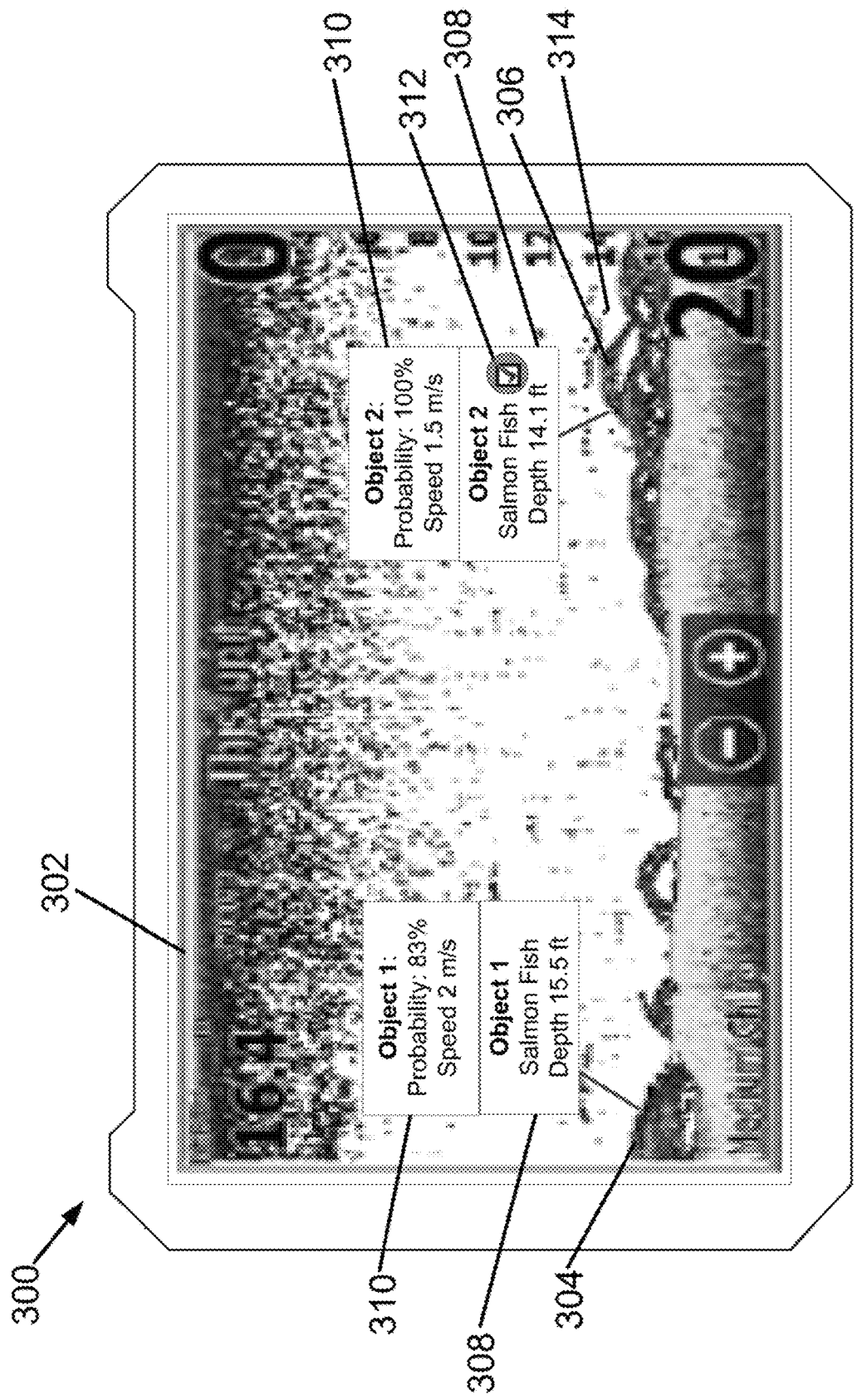

FIG. 3C presents an example display 300 with a second window 310 that is illustrated within the first area 302. In this embodiment, the display 300 comprises a first area 302, and the first window 308 and the second window 310 are both illustrated within the first area 302. The second window 310 may be presented in the display 300 upon the selection of an object by a user. For example, a user may select the representation of the second object 306, the first window 308 associated with the second object (if it is provided), or an area 314 near the representation of the second object 306. Upon the selection of a representation of an object by a user, an indicator may be sent to a processor to indicate that the user has selected the object. After receiving the indicator that the user has selected the object, the processor may cause the presentation of an indication of additional object characteristics for the object in the display 300. In the embodiment presented in FIG. 3C, the additional object characteristics comprise the designated object number (and/or a title) for the object, the anticipated probability or confidence that the type of object predicted is correct, and the speed of the object. In some embodiments, this speed may be relative to the speed of the watercraft, but the actual speed may be provided in other embodiments. Additionally, where the anticipated probability or confidence that the type of object predicted is correct exceeds a certain threshold, an indicator 312 may be provided, giving a quick indication that the confidence in the estimated object-type is high. While the second window 310 is shown as being shown in addition to the first window 308, the second window 310 may replace the first window 308 in some embodiments or serve as an expansion of the first window 308.

Figure 3D:
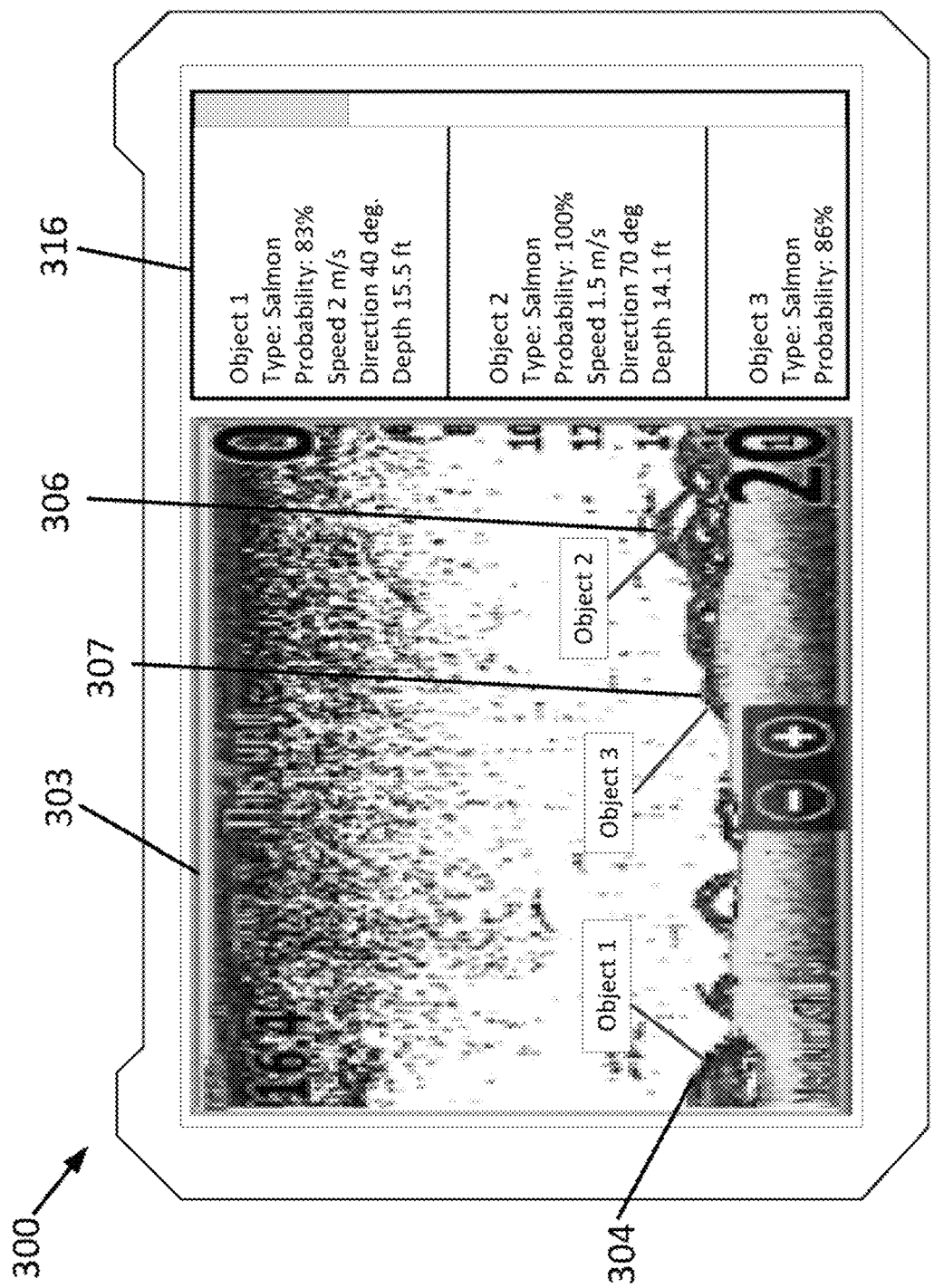

FIG. 3D presents another example display 300 with a first area 303 and a second area 316. In this embodiment, sonar data is presented within the first area 303 with various objects represented. A first object 304, a second object 306, and a third object 307 are illustrated in the sonar data presented in the first area 303. Indications of one or more object characteristics are provided in the second area 316, and corresponding links to each representation of the object within the sonar data are provided via an object designation number (although other linking descriptors are contemplated). This second area 316 is separate from the first area 303. In some embodiments, only a limited amount of information may be presented about object characteristics in the second area 316, and the user may select an object to cause further information to be presented. However, in the embodiment shown, all information may be presented in the second area 316, and a user may scroll through the provided information.

Figure 3E:
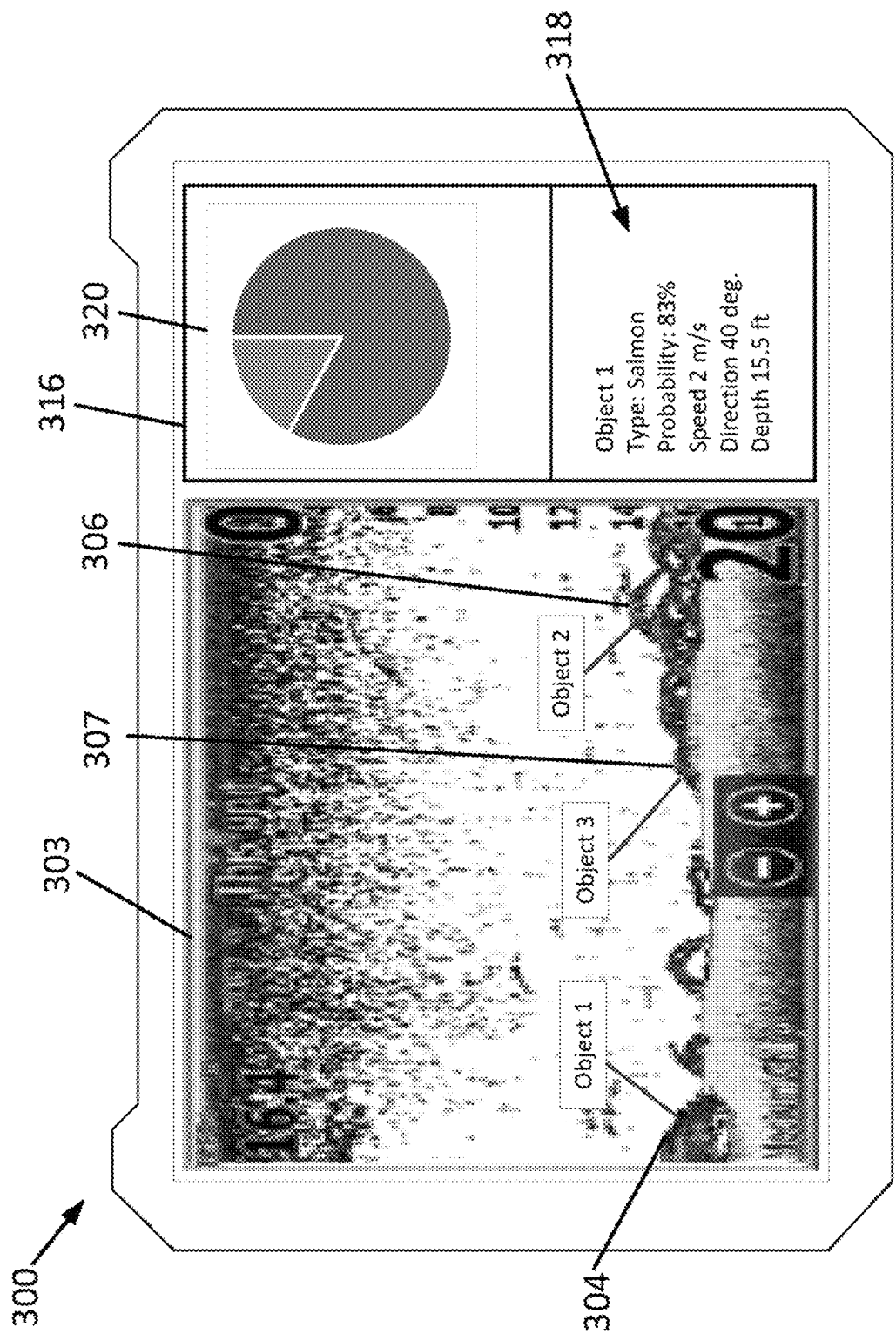

FIG. 3E illustrates another example embodiment. A second area 316 may be provided with textual information 318 and/or graphical information 320. Textual information 318 may comprise the object number or a name associated with the object. Textual information 318 may also comprise the type of object, the probability or confidence level for the prediction of the object type, the direction of the object, the speed of the object (if any), and the depth of the object. Other textual information 318 may also be presented, including, but not limited to, other potential object types, information about other nearby objects, etc. Graphical information 320 may also be provided. This may present information about the potential types of objects. For example, the graphical information 320 in the embodiment shown illustrates that the object is most likely salmon, with bass being the next most likely fish-type. Other types of graphical information 320 may also be provided, for example, the speed or depth of the object may be provided as a function of time.

In some embodiments, the improved displays may present information about the expected paths of the watercraft and of one or more objects represented in the display. The improved displays may also present information about the corrective actions that may be taken to avoid objects and/or an expected path of the watercraft if the corrective action is taken. By presenting this information and presenting warnings about objects that fall within the path of the watercraft, the display may allow for quick and accurate adjustments to be made to help avoid dangerous contact with other objects. Corrective action may be taken to approach an object as well when desired.

In some embodiments, the displays may emphasize certain representations of objects so that certain objects may be more readily apparent to a user. This emphasis may be provided by illustrating a representation of an object in a different color on the display, illustrating an outline of a representation of an object in the display, superimposing a representation of an object in the display so that it is presented in front of any other overlapping representations. The emphasis may also be provided in other ways, such as by presenting an emphasized object while hiding other objects. By emphasizing certain representations of objects, these representations may be quickly detected by a user viewing the display, allowing the user to make decisions more efficiently.

Example Sonar Images and Object-Types

The subsequent figures present various sonar images with different types of objects presented within the sonar images. The representations of these objects within the display present various distinctive features, and these features may be extracted from the sonar images and used within artificial intelligence ("AI") or algorithmic approaches to help with predictions about the object characteristics such as the type of object (e.g., type of fish).

FIG. 4 illustrates an example display 400. This display 400 provides a split-screen view with a conical downscan sonar image 402 provided on the left in a first area and a linear downscan sonar image 404 presented on the right in a second area. A menu 406 is also presented on the right side of the display 400 to allow a user to modify the images presented on the display 400. Within the conical downscan sonar image 402, a representation of a school of crappie fish 408 is shown. The representation of crappie fish 408 is illustrated above a representation of bait 409 resting on the downward sloping floor 410. Similarly, the linear downscan image 404 presents the sonar data in a different manner, presenting the representations of the crappie fish 412 and the downward sloping floor 414.

Based on the distinctive features of the sonar images 402 and 404 and additional data, AI or a programmed algorithm would be able to determine that the representation 408 is associated with crappie fish. The crappie fish are piled up vertically above the floor at a very high intensity. Additionally, using the linear downscan image 404, the individual crappie fish can be recognized, making it clear that the representations 408 and 412 are representing a school of fish rather than structure. Thus, where different types of sonar images are available, the different sonar images may be analyzed and compared to improve the accuracy of object-type predictions. By recognizing distinctive features within sonar images 402 and 404 and by recognizing distinctive features in other available data, the artificial intelligence may develop an estimated object-type, animal-type, or fish-type. For example, the system may take into account various other object characteristics detailed herein, such as the shape of the object, the depth of the object, an environment of the object (e.g., the relative position of the object in relation to other objects in the sonar image—such as the sea floor), the velocity of the object, the temperature of the water, the intensity of the sonar data, the intensity of the additional data, the behavior of the object, the geographical area, the time of day, or the time of year. In some embodiments, based on a correlative pattern between multiple object characteristics, the estimated object-type of crappie fish may be determined.

FIG. 5 illustrates another example display 500 with sonar images of white bass. This example display 500 comprises a conical downscan sonar image 502 on the left, a sidescan sonar image 504 on the right, and a menu 506. These images were taken in the inland portions of the United States. In the conical downscan sonar image 502, a representation of a school of white bass 508 is shown just above the floor 510 at a depression 512. Additionally, in the sidescan sonar image 504, the school of white bass 508' are illustrated from another perspective. The white bass can be seen just above the depression 512', which is shown with a darker shade within the sonar image than other surrounding portions of the floor of the body of water.

These images provide distinctive features that, when used in conjunction with other additional data, may be used to predict the type of fish represented in the images. Here, the fish are piled up together near a depression 512, 512' in the floor. One could determine from this data that this is a representation of bass or white bass specifically based on the fish behavior and based on the fact that these images were taken from an inland U.S. location. Thus, the sonar images and additional data in the form of the geographical location of the boat may be used to accurately predict the fish-type in this instance. As noted above, in some embodiments, the system may take into account various other object characteristics detailed herein, such as the shape of the object, the depth of the object, an environment of the object, the velocity of the object, the temperature of the water, the intensity of the sonar data, the intensity of the additional data, the behavior of the object, the geographical area, the time of day, or the time of year. In some embodiments, based on a correlative pattern between multiple object characteristics, the estimated object-type of white bass may be determined.

FIGS. 6A and 6B illustrate a downscan sonar image 600 and a sidescan sonar image 650 respectfully, with a whale 602, 602' and a calf 604, 604' represented within the images. Here the sidescan sonar image 650 splits the representations of the whale 602' and the calf 604'. This may occur where an object is directly underneath the watercraft. However, the size and shape of the representations of the whale and the calf shown in the downscan sonar image 600 and the shadows 606, 608 presented of the whale and the calf in the sidescan sonar image 650 make it clear what type of object is shown. Thus, different types of sonar data may be effectively used to provide more information and to more accurately determine the object-type. As noted above, in some embodiments, the system may take into account various other object characteristics detailed herein, such as the shape of the object, the depth of the object, an environment of the object, the velocity of the object, the temperature of the water, the intensity of the sonar data, the intensity of the additional data, the behavior of the object, the geographical area, the time of day, or the time of year. In some embodiments, based on a correlative pattern between multiple object characteristics, the estimated object-type of whale may be determined.

FIG. 7 illustrates a display 700 with a conical downscan sonar image 702. Here, the conical downscan sonar image 702 comprises representations of several salmon fish 708. The type of fish may be recognized here based on the behavior of the fish, with the fish staying close to the floor of the body of water. Additionally, the arch of the fish presented in the conical downscan sonar image 702 may also provide an indication that the representation 708 is showing a salmon fish. Other useful information may be utilized to assist with the estimation of the fish-type, including the clustering of the fish together and the geographical region where the images were taken. As noted above, in some embodiments, the system may take into account various other object characteristics detailed herein, such as the shape of the object, the depth of the object, an environment of the object, the velocity of the object, the temperature of the water, the intensity of the sonar data, the intensity of the additional data, the behavior of the object, the geographical area, the time of day, or the time of year. In some embodiments, based on a correlative pattern between multiple object characteristics, the estimated object-type of salmon may be determined.

FIG. 8 illustrates a display 800 with a first downscan sonar image 802, a second downscan sonar image 804, and a sidescan sonar image 806. Here there is a representation of a shark 808 within the first downscan sonar image 802, where the shark is located underneath the watercraft. This shark may also be seen as representation 808' in the second downscan sonar image 804. Because the shark is located directly beneath the watercraft, the sidescan sonar image 806 may not present as much detail about the shark as the other images. However, the system may determine that the representation 808, 808' is a shark based on the size and shape of the representation and the associated shadow 810. Other distinctive features that may assist with this estimation of the animal-type may include the location of the watercraft, information about the environment and the surrounding objects near the representation, information about the movement of the representation over time. However, other features may also be utilized to assist with the prediction. As noted above, in some embodiments, the system may take into account various other object characteristics detailed herein, such as the shape of the object, the depth of the object, an environment of the object, the velocity of the object, the temperature of the water, the intensity of the sonar data, the intensity of the additional data, the behavior of the object, the geographical area, the time of day, or the time of year. In some embodiments, based on a correlative pattern between multiple object characteristics, the estimated object-type of shark may be determined.

FIG. 9 illustrates another display 900 comprising a first downscan sonar image 902 and a menu 904. In this image 902, representations of two schools of bluefin tuna 906, 908 are illustrated. Here, the distinctive features that may assist with the object-type predictions may include the temperature of the water, the identified depth at which the representation is located, the intensity of the sonar data, the size and shape of the representations, and the movement of the individual fish. As noted above, in some embodiments, the system may take into account various other object characteristics detailed herein, such as the shape of the object, the depth of the object, an environment of the object, the velocity of the object, the temperature of the water, the intensity of the sonar data, the intensity of the additional data, the behavior of the object, the geographical area, the time of day, or the time of year. In some embodiments, based on a correlative pattern between multiple object characteristics, the estimated object-type of bluefin tuna may be determined.

FIGS. 10A and 10B illustrate various sonar images that may be presented on a display. In FIG. 10A, a display 1000 is shown with a downscan sonar image 1002 and a sidescan sonar image 1004. Here, representations of barramundi fish (also known as "barra" fish) are shown, with the representation of one barra fish 1006 shown at a higher elevation than the others. This barra fish can be seen rising to approach a bait ball 1008. Within FIG. 10B, a live sonar image 1050 is shown (e.g., where the entire image updates in real-time). This image 1050 is very clear, allowing the representation of the barra fish 1056 to be easily detected. This shows that the quality of the sonar images and the quality of the other data that is provided may improve the accuracy or reliability of object-type predictions. Thus, here, the shape and size of the representation of the barra fish 1056 and the behavior of the barra fish may play a key role in estimating the fish-type, but other information may also assist with this estimation. As noted above, in some embodiments, the system may take into account various other object characteristics detailed herein, such as the shape of the object, the depth of the object, an environment of the object, the velocity of the object, the temperature of the water, the intensity of the sonar data, the intensity of the additional data, the behavior of the object, the geographical area, the time of day, or the time of year. In some embodiments, based on a correlative pattern between multiple object characteristics, the estimated object-type of barra fish may be determined.

FIG. 11-15 illustrate various images comprising representations of underwater structure. In some instances, this underwater structure may present a hazard to the user or the watercraft, making it important to recognize this structure so that it can be avoided. In other instances, the underwater structure may be a location where certain fish tend to populate, so a user may wish to recognize this structure so that the user may approach the structure and catch more fish of a desired type.

FIG. 11 illustrates an example display 1100 comprising a sidescan sonar image 1102 in a first area and a menu 1104 in a second area. The sidescan sonar image 1102 includes a representation of a landmass 1106 and an associated shoreline 1108. The elevation of the floor of the body of water may be detected based on the gradient presented on the images. For example, the images may have an increased brightness at areas with a higher elevation, indicating that the elevation is decreasing as you move from the left at the coastline 1108 towards the right. The dark area in the center of the image 1102 may be the area directly underneath a watercraft, and the bright areas directly adjacent to this dark area may be areas close to the watercraft. In this embodiment, information may be presented to the user about the object-type within the sonar image 1102. For example, an indication may be provided that the object presented on the left side of the display 1100 is a landmass. As noted above, in some embodiments, the system may take into account various other object characteristics detailed herein, such as the shape of the object, the depth of the object, an environment of the water, the intensity of the sonar data, the intensity of the additional data, the behavior of the object, the geographical area, the time of day, or the time of year. In some embodiments, based on a correlative pattern between multiple object characteristics, the estimated object-type of landmass may be determined.

FIG. 12 illustrates an example display 1200 comprising a downscan sonar image 1202 and a sidescan sonar image 1204. In this image, representations of underwater pylons 1206, 1206' are illustrated. This may be detected based on the static nature of the pylons, the general size and shape of the pylons, as well as specific spacing of the pylons. Thus, a user may wish to avoid these pylons where they may potentially be high enough to come in contact with the watercraft. Alternatively, the user may wish to approach the pylons to catch certain types of fish that may frequently populate surrounding areas near the pylons. As noted above, in some embodiments, the system may take into account various other object characteristics detailed herein, such as the shape of the object, the depth of the object, an environment of the object, the velocity of the object, the temperature of the water, the intensity of the sonar data, the intensity of the additional data, the behavior of the object, the geographical area, the time of day, or the time of year. In some embodiments, based on a correlative pattern between multiple object characteristics, the estimated object-type of structure may be determined.

FIG. 13 illustrates an example downscan sonar image 1300. In this image, various objects are represented in the display, with representations of a submersed bridge 1302, an elevation 1304, and other submersed objects such as trees. Using the downscan sonar image 1300, image recognition techniques may be used to identify the type of object presented here. In some embodiments, an indication may be provided that structure is located at a certain position, but greater specificity may be provided in other embodiments on the object-type so that the user may be informed that elevations 1304, a submersed bridge 1302, or other specific types of objects are present. As noted above, in some embodiments, the system may take into account various other object characteristics detailed herein, such as the shape of the object, the depth of the object, an environment of the object, the velocity of the object, the temperature of the water, the intensity of the sonar data, the intensity of the additional data, the behavior of the object, the geographical area, the time of day, or the time of year. In some embodiments, based on a correlative pattern between multiple object characteristics, the estimated object-type of structure may be determined.

FIG. 14 illustrates another example display 1400 with a three-dimensional ("3D") downscan sonar image 1402 in a first area as well as a menu 1404 in a second area. The downscan sonar image 1402 comprises a representation of the linear downscan area 1406 to show the areas that are covered by the downscan image. The image also includes a pipeline 1408. As noted above, in some embodiments, the system may take into account various other object characteristics detailed herein, such as the shape of the object, the depth of the object, an environment of the object, the velocity of the object, the temperature of the water, the intensity of the sonar data, the intensity of the additional data, the behavior of the object, the geographical area, the time of day, or the time of year. In some embodiments, based on a correlative pattern between multiple object characteristics, the estimated object-type of a pipeline may be determined.

FIG. 15 illustrates another example display 1500 with a 3D downscan sonar image 1506. The linear downscan area 1508 is presented to show the areas that are covered by the sonar. This sonar image 1506 illustrates various depressions 1510 within the floor and schools of fish populated densely within those depressions 1510. Using this information about the elevations and depressions at the floor, more accurate estimations of object-types, animal-types, or fish-types may be provided.

Example System Architecture

FIG. 16 illustrates a block diagram of an example system 1600 according to various embodiments of the present invention described herein. The system advantageously provides for the use of a wide variety of inputs, and these inputs may be utilized to receive data that may be used to assist in the determination of object characteristics or in the determination of an object-type, animal-type, or fish-type. This also permits inputs to be provided via several different means, as devices may communicate with a processor within a marine electronic device via a wired connection, a wireless connection, or a connection through an external network.

The illustrated system 1600 includes a marine electronic device 1605. The system 1600 may comprise numerous marine devices. As shown in FIG. 16, one or more sonar transducer assemblies 1662 may be provided. A radar 1656, a rudder 1657, a primary motor 1658, a trolling motor 1659, and additional sensors/devices 1660 may also be provided as marine devices, but other marine devices may be provided as well. One or more marine devices may be implemented on the marine electronic device 1605. For example, a position sensor 1645, a direction sensor 1648, an autopilot 1650, and other sensors 1652 may be provided within the marine electronic device 1605. These marine devices can be integrated within the marine electronic device 1605, integrated on a watercraft at another location and connected to the marine electronic device 1605, and/or the marine devices may be implemented at a remote device 1654 in some embodiments. The system 1600 may include any number of different systems, modules, or components; each of which may comprise any device or means embodied in either hardware, software, or a combination of hardware and software configured to perform one or more corresponding functions described herein.

The marine electronic device 1605 may include at least one processor 1610, a memory 1620, a communication interface 1630, a user interface 1635, a display 1640, autopilot 1650, and one or more sensors (e.g. position sensor 1645, direction sensor 1648, other sensors 1652). One or more of the components of the marine electronic device 1605 may be located within a housing or could be separated into multiple different housings (e.g., be remotely located).

The processor(s) 1610 may be any means configured to execute various programmed operations or instructions stored in a memory device (e.g., memory 1620) such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the at least one processor 1610 as described herein. In this regard, the at least one processor 1610 may be configured to analyze electrical signals communicated thereto to provide or receive sonar data from one or more sonar transducer assemblies and additional (e.g., secondary) data from other sources. For example, the at least one processor 1610 may be configured to receive sonar data and additional data, determine an expected position, velocity (if any), an object type for an object, and/or determine a corrective action based on the deviation.

In some embodiments, the at least one processor 1610 may be further configured to implement signal processing. In some embodiments, the at least one processor 1610 may be configured to perform enhancement features to improve the display characteristics of data or images, collect or process additional data, such as time, temperature, GPS information, waypoint designations, or others, or may filter extraneous data to better analyze the collected data. The at least one processor 1610 may further implement notices and alarms, such as those determined or adjusted by a user, to reflect proximity of other objects (e.g., represented in sonar data), to reflect proximity of other vehicles (e.g. watercraft), approaching storms, etc.

In an example embodiment, the memory 1620 may include one or more non-transitory storage or memory devices such as, for example, volatile and/or non-volatile memory that may be either fixed or removable. The memory 1620 may be configured to store instructions, computer program code, sonar data, and additional data such as radar data, chart data, location/position data in a non-transitory computer readable medium for use, such as by the at least one processor 1610 for enabling the marine electronic device 1605 to carry out various functions in accordance with example embodiments of the present invention. For example, the memory 1620 could be configured to buffer input data for processing by the at least one processor 1610. Additionally or alternatively, the memory 1620 could be configured to store instructions for execution by the at least one processor 1610.

The communication interface 1630 may be configured to enable communication to external systems (e.g. an external network 1602). In this manner, the marine electronic device 1605 may retrieve stored data from a remote device 1654 via the external network 1602 in addition to or as an alternative to the onboard memory 1620. Additionally or alternatively, the marine electronic device 1605 may transmit or receive data, such as sonar signal data, sonar return data, sonar image data, or the like to or from a sonar transducer assembly 1662. In some embodiments, the marine electronic device 1605 may also be configured to communicate with other devices or systems (such as through the external network 1602 or through other communication networks, such as described herein). For example, the marine electronic device 1605 may communicate with a propulsion system of the watercraft 100 (e.g., for autopilot control); a remote device (e.g., a user's mobile device, a handheld remote, etc.); or another system. Using the external network 1602, the marine electronic device may communicate with and send and receive data with external sources such as a cloud. The marine electronic device may send and receive various types of data. For example, the system may receive weather data, data from other fish locator applications, alert data, among others. However, this data is not required to be communicated using external network 1602, and the data may instead be communicated using other approaches, such as through a physical or wireless connection via the communications interface 1630.

The communications interface 1630 of the marine electronic device 1605 may also include one or more communications modules configured to communicate with one another in any of a number of different manners including, for example, via a network. In this regard, the communications interface 1630 may include any of a number of different communication backbones or frameworks including, for example, Ethernet, the NMEA 2000 framework, GPS, cellular, Wi-Fi, or other suitable networks. The network may also support other data sources, including GPS, autopilot, engine data, compass, radar, etc. In this regard, numerous other peripheral devices (including other marine electronic devices or sonar transducer assemblies) may be included in the system 1600.

The position sensor 1645 may be configured to determine the current position and/or location of the marine electronic device 1605 (and/or the watercraft 100). For example, the position sensor 1645 may comprise a GPS, bottom contour, inertial navigation system, such as machined electromagnetic sensor (MEMS), a ring laser gyroscope, or other location detection system. Alternatively or in addition to determining the location of the marine electronic device 1605 or the watercraft 100, the position sensor 1645 may also be configured to determine the position and/or orientation of an object outside of the watercraft 100.

The display 1640 (e.g. one or more screens) may be configured to present images and may include or otherwise be in communication with a user interface 1635 configured to receive input from a user. The display 1640 may be, for example, a conventional LCD (liquid crystal display), a touch screen display, mobile device, or any other suitable display known in the art upon which images may be displayed.

In some embodiments, the display 1640 may present one or more sets of data (or images generated from the one or more sets of data). Such data includes chart data, radar data, sonar data, weather data, location data, position data, orientation data, sonar data, or any other type of information relevant to the watercraft. Sonar data may be received from one or more sonar transducer assemblies 1656 or from sonar devices positioned at other locations, such as remote from the watercraft. Additional data may be received from marine devices such as a radar 1656, a primary motor 1658 or an associated sensor, a trolling motor 1659 or an associated sensor, an autopilot, a rudder 1657 or an associated sensor, a position sensor 1645, a direction sensor 1648, other sensors 1652, a remote device 1654, onboard memory 1620 (e.g., stored chart data, historical data, etc.), or other devices.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 1635 may include, for example, a keyboard, keypad, function keys, mouse, scrolling device, input/output ports, touch screen, or any other mechanism by which a user may interface with the system.

Although the display 1640 of FIG. 16 is shown as being directly connected to the at least one processor 1610 and within the marine electronic device 1605, the display 1640 could alternatively be remote from the at least one processor 1610 and/or marine electronic device 1605. Likewise, in some embodiments, the position sensor 1645 and/or user interface 1635 could be remote from the marine electronic device 1605.

The marine electronic device 1605 may include one or more other sensors/devices 1652, such as configured to measure or sense various other conditions. The other sensors/devices 1652 may include, for example, an air temperature sensor, a water temperature sensor, a current sensor, a light sensor, a wind sensor, a speed sensor, or the like.

The sonar transducer assemblies 1662 illustrated in FIG. 16 may include one or more sonar transducer elements 1667, such as may be arranged to operate alone or in one or more transducer arrays. In some embodiments, additional separate sonar transducer elements (arranged to operate alone, in an array, or otherwise) may be included. As indicated herein, the sonar transducer assemblies 1662 may also include a sonar signal processor or other processor (although not shown) configured to perform various sonar processing. In some embodiments, the processor (e.g., at least one processor 1610 in the marine electronic device 1605, a controller (or processor portion) in the sonar transducer assemblies 1662, or a remote controller—or combinations thereof) may be configured to filter sonar return data and/or selectively control transducer element(s) 1667. For example, various processing devices (e.g., a multiplexer, a spectrum analyzer, A-to-D converter, etc.) may be utilized in controlling or filtering sonar return data and/or transmission of sonar signals from the transducer element(s) 1667.

The sonar transducer assemblies 1662 may also include one or more other systems, such as various sensor(s) 1666. For example, the sonar transducer assembly 1662 may include an orientation sensor, such as gyroscope or other orientation sensor (e.g., accelerometer, MEMS, etc.) that can be configured to determine the relative orientation of the sonar transducer assembly 1662 and/or the one or more sonar transducer element(s) 1667—such as with respect to a forward direction of the watercraft. In some embodiments, additionally or alternatively, other types of sensor(s) are contemplated, such as, for example, a water temperature sensor, a current sensor, a light sensor, a wind sensor, a speed sensor, or the like.

The components presented in FIG. 16 may be rearranged to alter the connections between components. For example, in some embodiments, a marine device outside of the marine electronic device 1605, such as the radar 1656, may be directly connected to the at least one processor 1610 rather than being connected to the communication interface 1630. Additionally, sensors and devices implemented within the marine electronic device 1605 may be directly connected to the communications interface in some embodiments rather than being directly connected to the at least one processor 1610.

Example Flowchart(s) and Operations

Some embodiments of the present invention provide methods, apparatus, and computer program products related to the presentation of information in a display according to various embodiments described herein. Various examples of the operations performed in accordance with embodiments of the present invention will now be provided with reference to FIGS. 17A-17F. FIGS. 17A-17F present various flowcharts with example methods of determining one or more object characteristics and/or estimated object-types regarding object(s) represented in a sonar image. These methods may be performed by a wide variety of components, including, but not limited to, one or more processors, one or more microprocessors, and one or more controllers. In some embodiments, a marine electronic device 1605 (FIG. 16) may comprise one or more processors that perform the functions shown in FIGS. 17A-17F. Further, these methods may be provided on a piece of software which runs on a central server that is at a remote location away from the watercraft, and the remote server may communicate with a processor or a similar component on the watercraft. Additionally, the methods could be integrated into a software update that may be installed onto existing hardware, or the methods may be integrated into the initial software or hardware provided in a radar unit, watercraft, server, etc. By performing these methods, the displays may present information in a readily understandable manner, with object characteristics clearly provided.

Figure 17A:
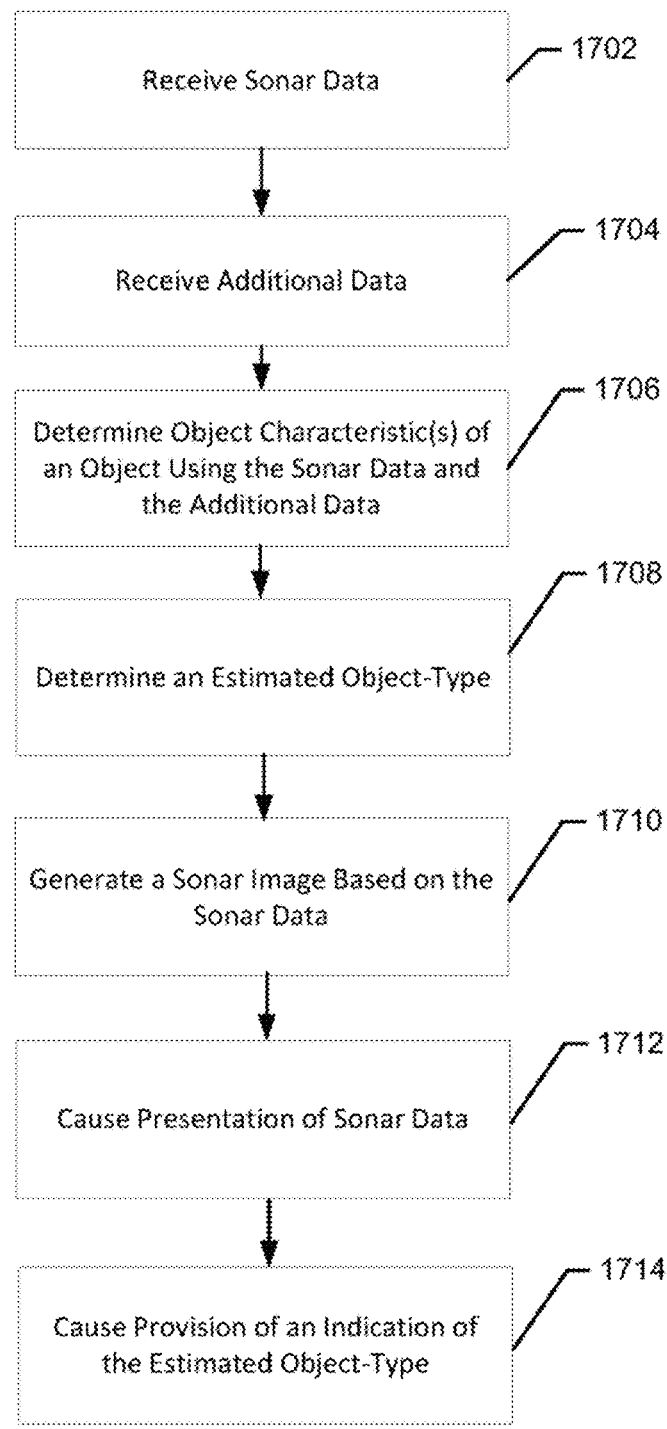

FIG. 17A is a flowchart of an example method for displaying sonar data and providing indications of one or more object characteristics and/or estimated object-types for objects that are represented in the sonar data, in accordance with some embodiments discussed herein. This method as well as the methods presented in FIGS. 17B-17F may beneficially provide a user with an indication of an estimated object-type and/or additional information about an object represented in sonar data so that the user can make more well-informed decisions.

At operation 1702, sonar data is received. This sonar data may comprise information including representations of one or more objects. At operation 1704, additional data is received from a data source other than a sonar transducer. This additional data may comprise at least one of humidity data, temperature data, pressure data, precipitation data, water current data, weather data, radar data, GPS data, compass data, heading sensor data, position data for a watercraft, directional data for a watercraft, directional data from a motor or a rudder of a watercraft, image data from a camera, data regarding the date or time, navigational data, or geographical data.

At operation 1706, one or more object characteristics is determined for an object using the sonar data and the additional data. The one or more object characteristics may comprise at least one of a shape of the object, a depth of the object, an environment of the object, a velocity of the object, a temperature of the water, an intensity of the sonar data, an intensity of the additional data, a behavior of the object, a geographical area, a time of day, or a time of year, but other object characteristics may also be determined.

At operation 1708, an estimated object-type is determined for the object that is represented within the sonar data. This estimation may be done using the one or more object characteristics. For example, where the object is an animal, the system may provide a general estimation that the object is an animal. In some embodiments, the system may in some embodiments determine an estimated animal-type. The estimated object-type may also be a general estimation that the object is some sort of man-made structure, but greater specificity may be provided in other embodiments. Similarly, in some embodiments, the system may determine that the object is a fish or determine an estimated fish-type.

At operation 1710, a sonar image is generated based on the sonar data, where the sonar image includes a representation of the object. In some embodiments, the sonar image may be generated by a processor or another comparable computing device located on a watercraft. However, in other embodiments, the sonar image may be generated by a processor or another comparable computing device at a remote location or at another location.

At operation 1712, the presentation of sonar data may be caused. This presented sonar data may comprise the generated sonar image. Sonar data may be presented within a display similar to as shown in FIGS. 3A-3E.

At operation 1714, the provision of an indication of the estimated object-type for the object is caused. In some embodiments, the provision of the indication may be provided in response to user input indicating a desire for the indication (e.g., selecting the object, a user providing input to the screen location corresponding to the representation of the object, the user selecting a setting, etc.). This indication may be presented on a display, but the indication may also be presented through other alternative approaches, such as through sound or vibration generated by a buzzer or a speaker. Where the indication is presented on the display, this indication may be correlated to the representation of the object in the sonar image. In some embodiments, additional one or more object characteristics corresponding to the objects may also be presented, either at operation 1712 or 1714.

Figure 17B:
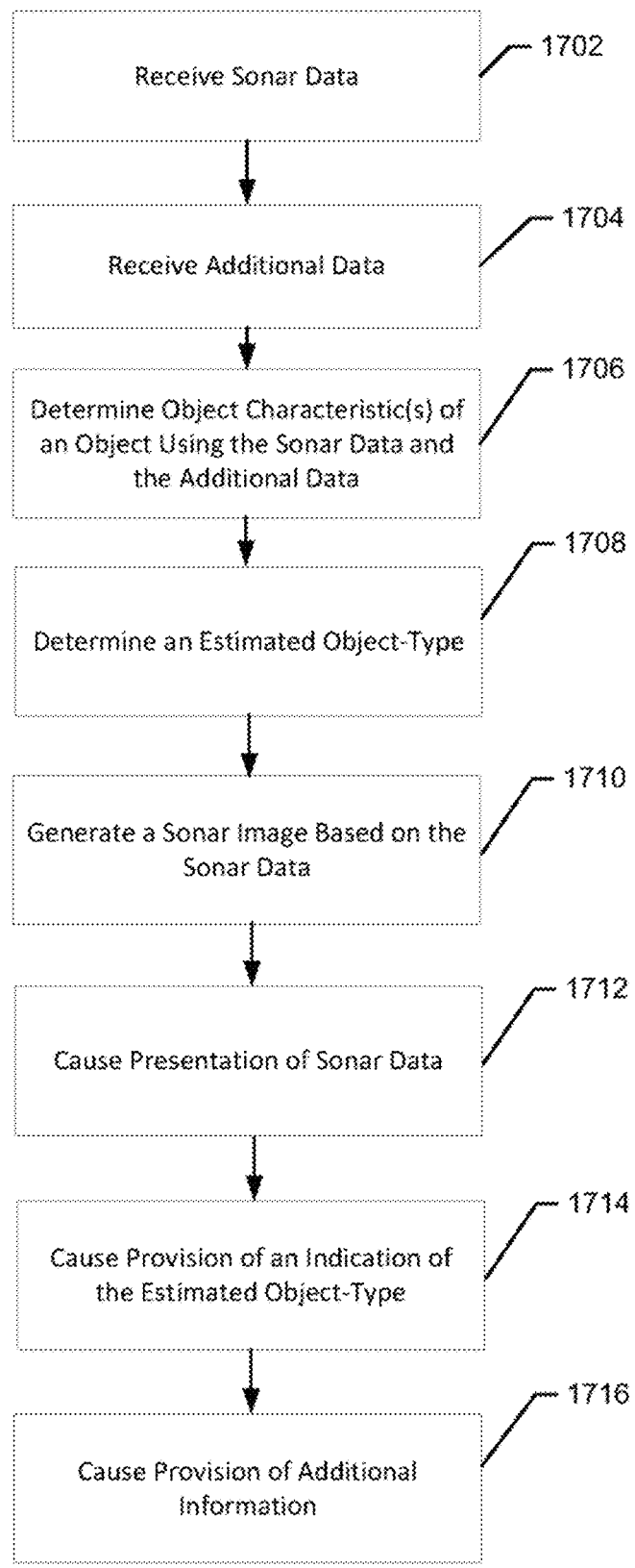

FIGS. 17B-17F illustrate variations of the example method illustrated in FIG. 17A. In FIG. 17B, operation 1716 is performed in addition to various operations presented in FIG. 17A. At operation 1716, the provision of additional information is caused. This additional information may comprise information about the estimated object-type. This additional information may also comprise a probability that the object has an estimated object-type, the determined one or more object characteristics, hazards presented by the object, or the direction of the object. Other types of additional information may also be provided at operation 1716. This additional information may be presented on a display, but the indication may also be presented through other alternative approaches, such as through sound or vibration generated by a buzzer or a speaker.

As stated above, the method may be performed so that an estimated animal-type is determined using the determined one or more object characteristics. Where this is done, the additional information provided at operation 1716 may comprise the estimated animal-type. This additional information may also comprise a probability that the object has an estimated animal-type, the determined one or more object characteristics, hazards presented by the animal, the direction of the animal, a predicted number of similar estimated animal-types nearby, bait information about specific types of bait that the estimated animal-type is attracted to, or unique behaviors of the estimated animal-type. However, other types of information may also be provided.

In other embodiments, the method may be performed so that an estimated fish-type is determined using the determined one or more object characteristics. Where this is done, the additional information provided at operation 1716 may comprise the estimated fish-type. This additional information may also comprise a probability that the object has an estimated fish-type, the determined one or more object characteristics, hazards presented by the fish, the direction of the fish, a predicted number of similar estimated fish-types nearby, bait information about specific types of bait that fish of the estimated fish-type are attracted to, or unique behaviors of the estimated fish-type. However, other types of information may also be provided.

Figure 17C:
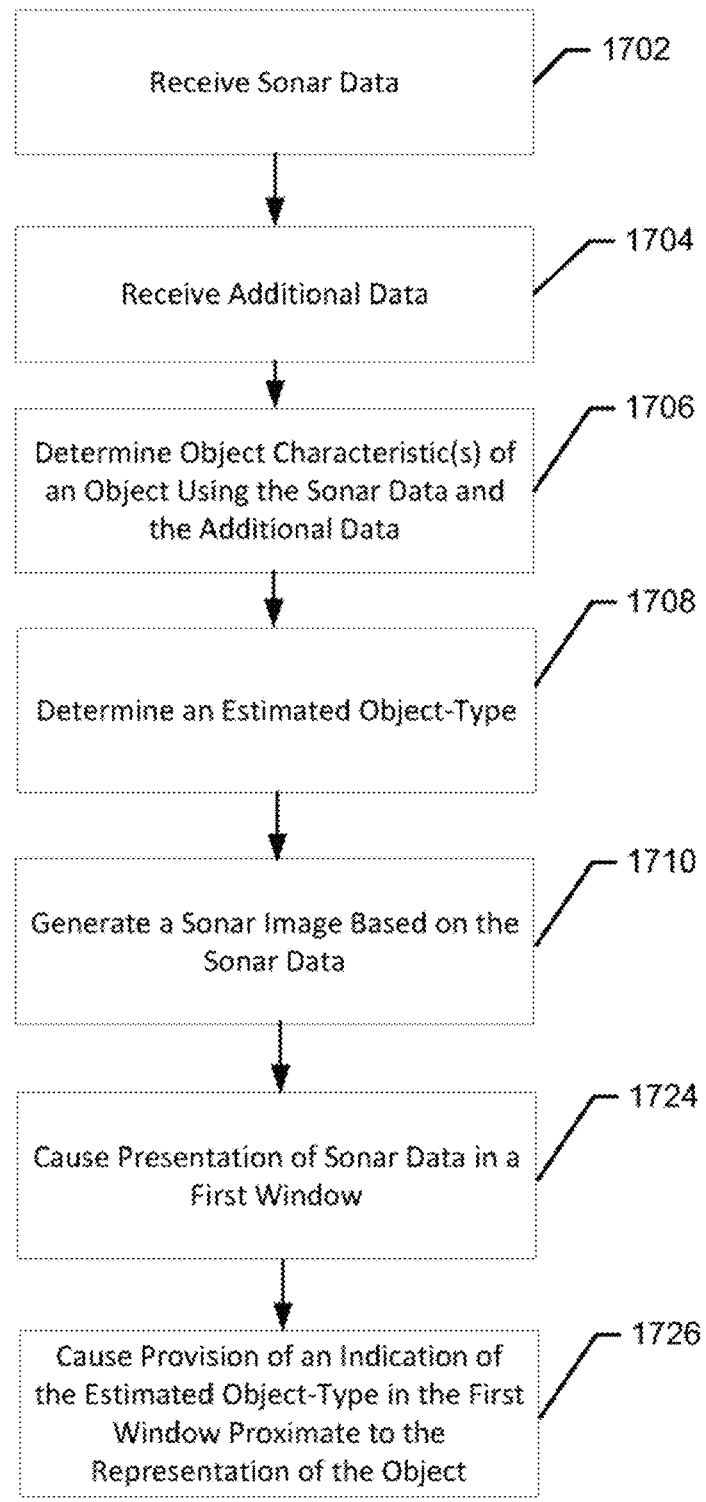

In FIG. 17C, operations 1724 and 1726 may be performed rather than operation 1714. At operation 1724, the presentation of sonar data is caused in a first window. This first window may fall within a first area defined within the display. This presented sonar data may comprise the generated sonar image. At operation 1726, the provision of an indication of the estimated object-type is caused in the first window proximate to the representation of the object. By performing this method, this sonar data and the indications may, for example, be presented as shown in FIG. 3B.

Figure 17D:
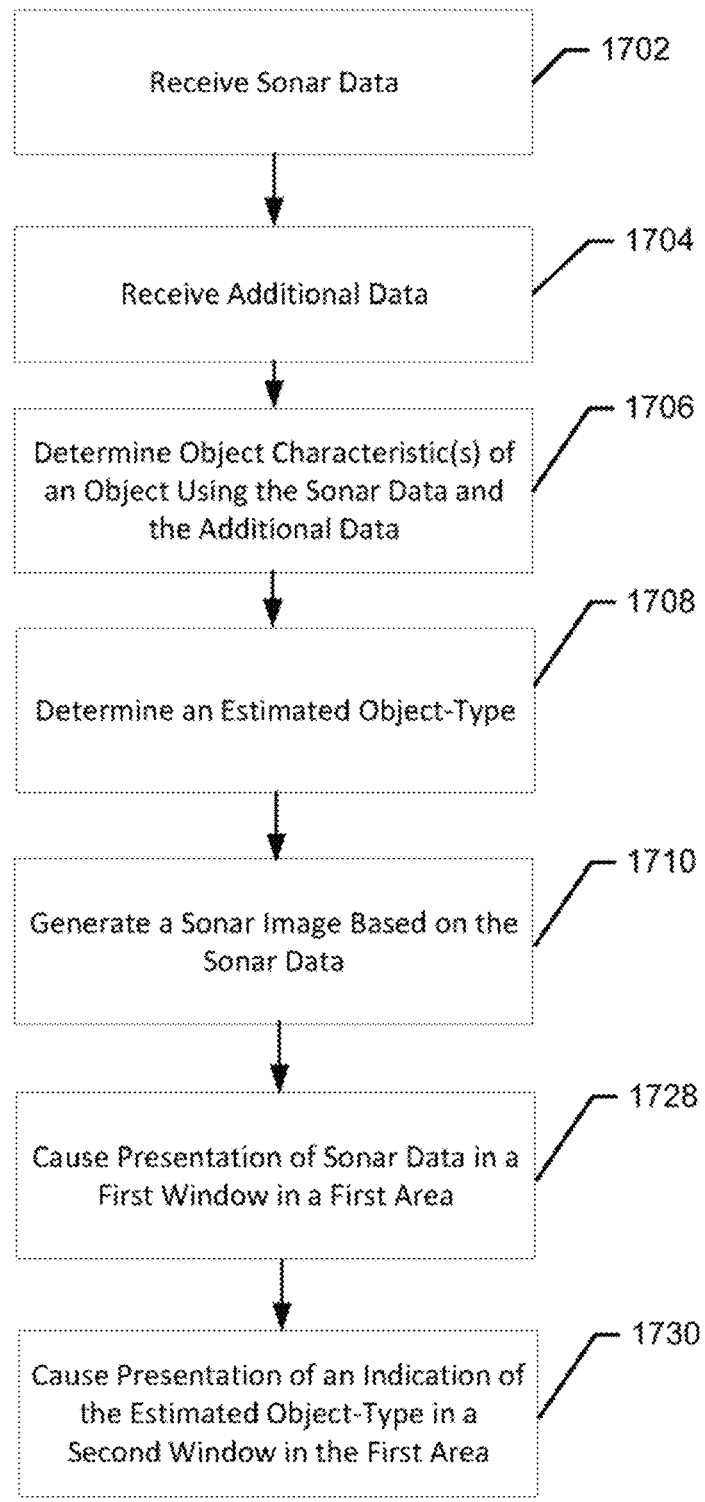

In FIG. 17D, operations 1728 and 1730 may be performed rather than operations 1712 and 1714. At operation 1728, the presentation of the sonar data may be caused in a first window, and this first window may fall within a first area. This presented sonar data may comprise the generated sonar image. At operation 1730, the presentation of the indication of the estimated object-type may be caused in a second window, and this second window may fall within the first area. The second window may serve as a pop-up window that appears in front of the first window. By performing this method, this sonar data and the indications may, for example, be presented as shown in FIG. 3C.

Figure 17E:
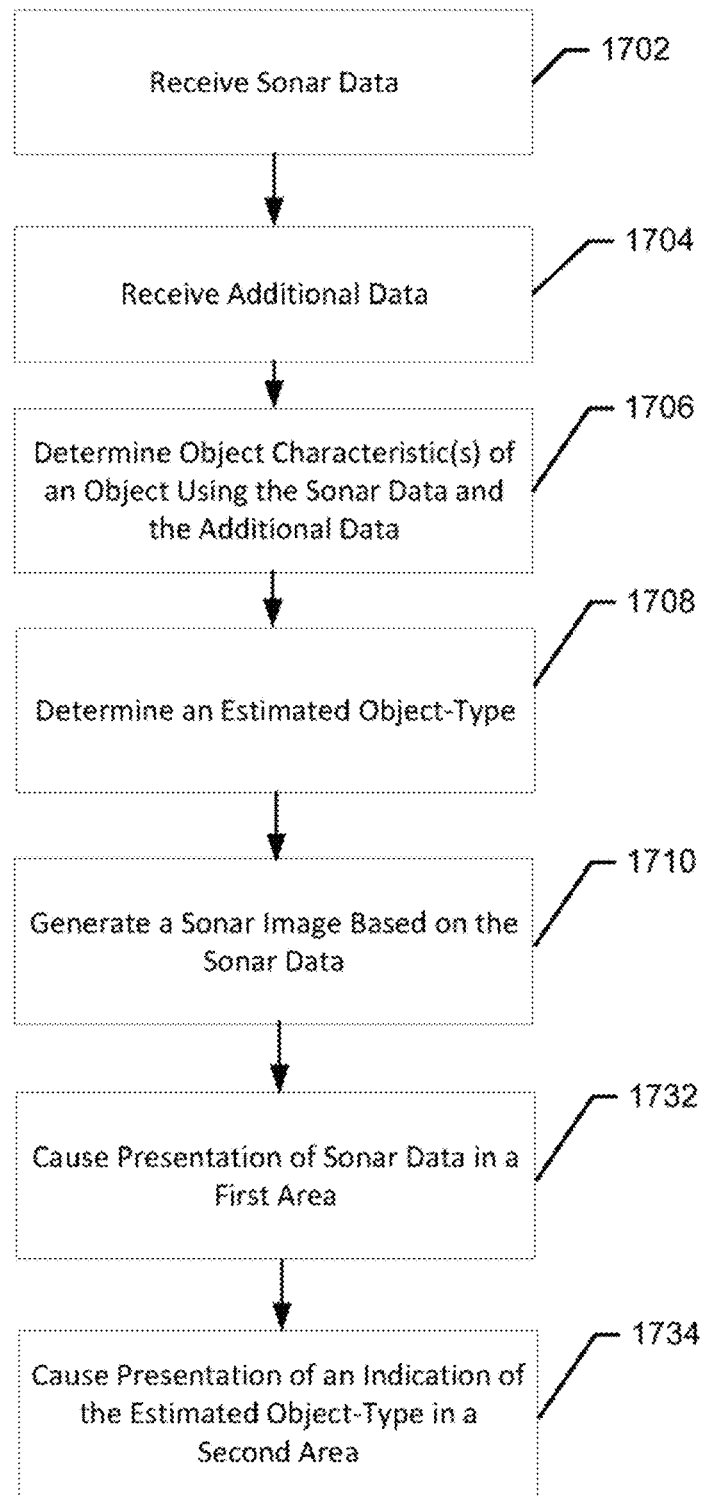

In FIG. 17E, operations 1732 and 1734 may be performed rather than operation 1712 and 1714. At operation 1732, the presentation of sonar data may be caused in the first area, and this sonar data may comprise a sonar image. At operation 1734, the presentation of an indication of the estimated object-type may be caused in a second area. This second area may be separate from the first area. By performing this method, this sonar data and the indications may, for example, be presented as shown in FIG. 3D or 3E.

Figure 17F:
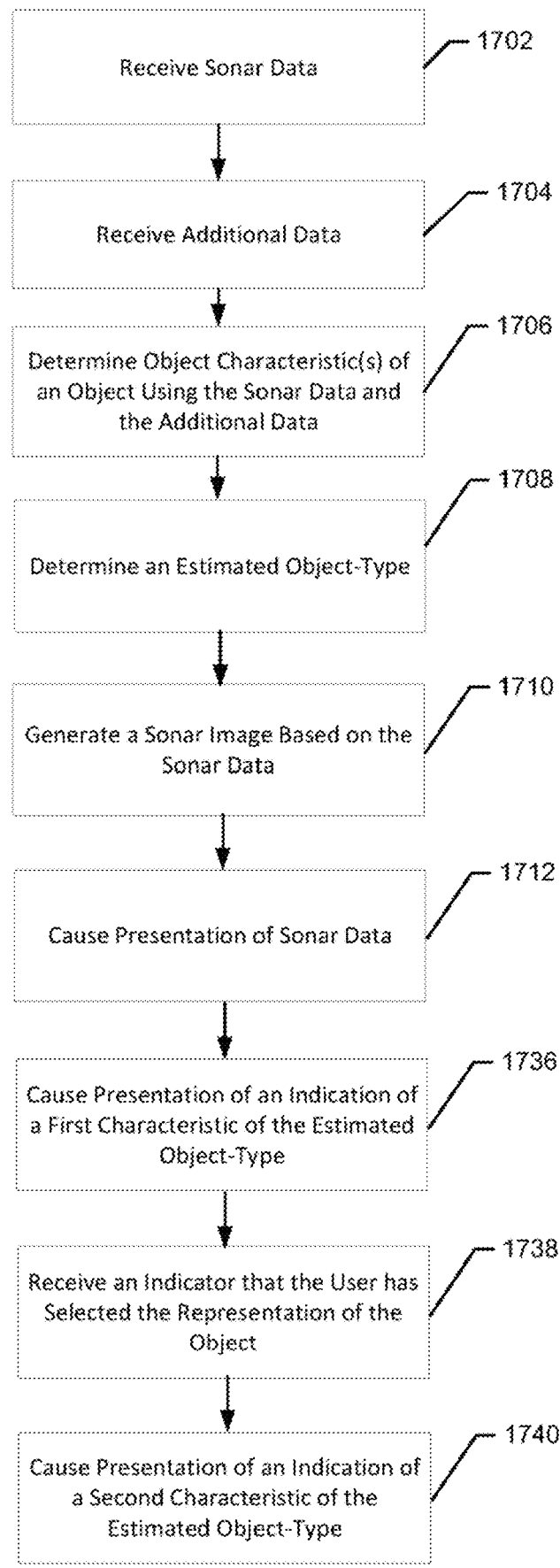

In FIG. 17F, operations 1736, 1738, and 1740 may be performed rather than operation 1714. At operation 1736, the presentation of an indication of a first characteristic of the estimated object-type is caused. This indication may be presented on a display, but the indication may also be presented through other alternative approaches, such as through sound or vibration generated by a buzzer or a speaker. This indication may be provided at any location on a display, such as proximate to the representation of the relevant object, within the same area as the sonar data, or in a separate area. At operation 1738, an indicator may be received that the user has selected the representation of the object. This selection may be performed on the display by receiving a touch input from a user, but the selection may also be done through another user interface, through voice input from the user, or through another approach. At operation 1740, the presentation of an indication of a second characteristic of the estimated object-type is caused. This indication may be caused in response to receiving the indicator that the user has selected the representation of the object at operation 1738. Again, this indication of the second characteristic may be presented at various locations on the display, and it may be presented at a different location than the indication of the first characteristic. This indication may be presented on a display, but the indication may also be provided through other alternative approaches, such as through sound or vibration generated by a buzzer or a speaker.

Thus, the method presented in FIG. 17F may allow for a limited amount of information to be presented on the display in standard operation, and a user may select the representation of an object to obtain more detailed information about that object. In some embodiments, detailed information may be provided for multiple objects in the display. The embodiments described with respect to FIG. 17F allow information to be presented in a readily understandable manner to the user, providing the user with the information that he or she desires. This may also limit the amount of information that is presented to the user, presenting the information that the user wishes to see while omitting other information that the user does not wish to see. By performing this method, this sonar data and the indications of multiple estimated object-type characteristics may, for example, be presented as shown in FIG. 3C or 3E.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A system for analysis of sonar data, wherein the system comprises:
    one or more sonar transducer assemblies configured to provide sonar data;
    one or more processors;
    a memory including computer program code configured to, when executed, cause the one or more processors to:
        receive the sonar data, wherein an object is represented within the sonar data;
        receive additional non-sonar data from a data source other than the one or more sonar transducer assemblies, wherein the additional non-sonar data includes data other than position data or orientation data;
        determine one or more object characteristics of the object using the sonar data and the additional non-sonar data, wherein the one or more object characteristics comprises at least one of a shape of the object, an environment of the object, a velocity of the object, a temperature of water, an intensity of the sonar data, an intensity of the additional non-sonar data, a behavior of the object, a geographical area, a time of day, or a time of year;
        determine an estimated object-type for the object that is represented within the sonar data using the one or more object characteristics by utilizing a model to determine the estimated object-type for the object, wherein the model is formed based on historical comparisons of a historical object-type with historical sonar data and historical additional non-sonar data;
        generate a sonar image based on the sonar data, wherein the sonar image includes a representation of the object;
        cause display of the sonar image;
        cause an indication of the estimated object-type for the object to be provided to a user, wherein the indication of the estimated object-type is correlated to the representation of the object in the sonar image; and
        cause presentation of information on the display within the sonar image about the estimated object-type to the user, wherein the presented information comprises the determined estimated object-type and a probability that the object has the determined estimated object-type.

2. The system of claim 1, wherein the model is developed through machine learning utilizing artificial intelligence based on the historical comparisons of the historical object-type with historical sonar data and historical additional non-sonar data.

3. The system of claim 1, wherein the additional non-sonar data is provided from at least one of a camera, a radar, a thermometer, a clock, or a pressure sensor.

4. The system of claim 1, wherein the one or more sonar transducer assemblies comprises at least one of a linear downscan sonar transducer, a conical downscan sonar transducer, a sonar transducer array, or a sidescan sonar transducer.

5. The system of claim 1, wherein the memory including computer program code is configured to, when executed, cause the one or more processors to determine the estimated object-type by determining an estimated animal-type using the determined one or more object characteristics.

6. The system of claim 5, wherein the memory including computer program code is configured to, when executed, cause the one or more processors to cause display of information about the estimated animal-type to the user, wherein the information comprises one or more estimated animal-types and at least one of a probability that the object has an estimated animal-type, the determined one or more object characteristics, hazards presented by the animal, a predicted number of similar estimated animal-types nearby, bait information about specific types of bait that the estimated animal-type is attracted to, or unique behaviors of the estimated animal-type.

7. The system of claim 5, wherein the memory including computer program code is configured to, when executed, cause the one or more processors to determine the estimated animal-type by determining an estimated fish-type using the determined one or more object characteristics.

8. The system of claim 1, wherein the additional non-sonar data comprises at least one of humidity data, temperature data, pressure data, precipitation data, water current data, weather data, radar data, compass data, heading sensor data, directional data for a watercraft, directional data from a motor or a rudder of a watercraft, image data from a camera, data regarding the date or time, navigational data, or geographical data.

9. The system of claim 1, wherein the memory including computer program code is further configured to, when executed, cause the one or more processors to:
cause presentation of the indication of the estimated object-type for the object in a first window along with the sonar data and such that the indication of the estimated object-type is presented proximate to the representation of the object.

10. The system of claim 1, wherein the display comprises at least a first area, wherein the memory including computer program code is further configured to, when executed, cause presentation of the sonar data in a first window within the first area and presentation of the indication of the estimated object-type in a second window within the first area.

11. The system of claim 1, wherein the display comprises at least a first area and a second area, wherein the memory including computer program code is further configured to, when executed, cause presentation of the sonar data in the first area and presentation of the indication of the estimated object-type in the second area, wherein the first area is separate from the second area.

12. The system of claim 1, wherein the one or more object characteristics comprises at least two object characteristics, wherein the computer program code is configured to, when executed, cause the processor to:
cause presentation of the indication of a first characteristic for the estimated object-type on the display;
receive an indicator that the user has selected the representation of the object within the display; and
cause, in response to receiving the indicator, the presentation of an indication of a second characteristic for the estimated object-type on the display.

13. The system of claim 1, wherein the additional non-sonar data includes at least one of geographical data from maps or nautical charts.

14. The system of claim 1, wherein the one or more sonar transducer assemblies are configured to be installed on a watercraft, and wherein the additional non-sonar data includes data from a source located remotely from the watercraft.

15. A marine electronic device for analysis of sonar data, wherein the marine electronic device comprises:
one or more processors;
a memory including computer program code configured to, when executed, cause the one or more processors to:
receive sonar data, wherein an object is represented within the sonar data;
receive additional non-sonar data from a data source other than a sonar transducer assembly, wherein the additional non-sonar data includes data other than position data or orientation data;
determine one or more object characteristics of the object using the sonar data and the additional non-sonar data, wherein the one or more object characteristics comprises at least one of a shape of the object, a depth of the object, an environment of the object, a velocity of the object, a temperature of water, an intensity of the sonar data, an intensity of the additional non-sonar data, behavior of the object, a geographical area, a time of day, or a time of year;
determine an estimated object-type for the object that is represented within the sonar data using the one or more object characteristics_by utilizing a model to determine the estimated object-type for the object, wherein the model is formed based on historical comparisons of a historical object-type with historical sonar data and historical additional non-sonar data, and wherein the model is developed through machine learning utilizing artificial intelligence;
generate a sonar image based on the sonar data, wherein the sonar image includes a representation of the object;
cause display of the sonar image;
cause an indication of the estimated object-type for the object to be provided to a user, wherein the indication of the estimated object-type is correlated to the representation of the object in the sonar image; and
causing presentation of information on the display within the sonar image about the estimated object-type to the user, wherein the presented information comprises the determined estimated object-type and a probability that the object has the determined estimated object-type.

16. A method for the analysis of sonar data, the method comprising:
receiving sonar data from one or more sonar transducer assemblies, wherein an object is represented within the sonar data;
receiving additional non-sonar data from a data source other than the one or more sonar transducer assemblies, wherein the additional non-sonar data includes data other than position data or orientation data;
determining one or more object characteristics of the object using the sonar data and the additional non-sonar data, wherein the one or more object characteristics comprises at least one of a shape of the object, a depth of the object, an environment of the object, a velocity of the object, a temperature of water, an intensity of the sonar data, an intensity of the additional non-sonar data, behavior of the object, a geographical area, a time of day, or a time of year;

determining an estimated object-type for the object that is represented within the sonar data using the one or more object characteristics by utilizing a model that is formed based on historical comparisons of a historical object-type with historical sonar data and historical additional non-sonar data, and wherein the model is developed through machine learning utilizing artificial intelligence;

generating a sonar image based on the sonar data, wherein the sonar image includes a representation of the object;

causing display of the sonar image;

causing an indication of the estimated object-type for the object to be provided to a user, wherein the indication of the estimated object-type is correlated to the representation of the object in the sonar image; and causing presentation of information on the display within the sonar image about the estimated object-type to the user, wherein the presented information comprises the determined estimated object-type and a probability that the object has the determined estimated object-type.

* * * * *